(12) United States Patent
Li et al.

(10) Patent No.: US 12,017,189 B2
(45) Date of Patent: Jun. 25, 2024

(54) DEVICES AND METHODS FOR WATER FILTRATION MEMBRANE

(71) Applicant: SHANGHAI TETRELS MATERIAL TECHNOLOGY CO., LTD., Shanghai (CN)

(72) Inventors: Kunzhou Li, Seoul (KR); Zisong Nie, Princeton, NJ (US)

(73) Assignee: SHANGHAI TETRELS MATERIAL TECHNOLOGY CO., LTD., Shanghai (CN)

( * ) Notice: Subject to any disclaimer, the term of this patent is extended or adjusted under 35 U.S.C. 154(b) by 735 days.

(21) Appl. No.: 17/269,628

(22) PCT Filed: Aug. 21, 2019

(86) PCT No.: PCT/US2019/047450
§ 371 (c)(1),
(2) Date: Feb. 19, 2021

(87) PCT Pub. No.: WO2020/041435
PCT Pub. Date: Feb. 27, 2020

(65) Prior Publication Data
US 2021/0362098 A1 Nov. 25, 2021

Related U.S. Application Data

(60) Provisional application No. 62/722,336, filed on Aug. 24, 2018.

(51) Int. Cl.
*B01D 71/02* (2006.01)
*B01D 67/00* (2006.01)
(Continued)

(52) U.S. Cl.
CPC ..... *B01D 71/024* (2013.01); *B01D 67/00793* (2022.08); *B01D 69/02* (2013.01);
(Continued)

(58) Field of Classification Search
None
See application file for complete search history.

(56) References Cited

U.S. PATENT DOCUMENTS

2012/0325737 A1* 12/2012 Lee .................. B01D 69/02
521/189
2013/0330833 A1   12/2013 Ruiz et al.
(Continued)

FOREIGN PATENT DOCUMENTS

| CN | 104445168 A | 3/2015 |
|---|---|---|
| CN | 105399084 A | 3/2016 |

(Continued)

OTHER PUBLICATIONS

S. Pandit, M. De, "Empirical Correlation and Validation of Lateral Size-Dependent Absorption Coefficient of Graphene Oxides," ChemistrySelect 2017, 2, 10004 (Year: 2017).*

(Continued)

*Primary Examiner* — Chester T Barry
(74) *Attorney, Agent, or Firm* — METIS IP LLC

(57) ABSTRACT

Water-filtration compositions, membranes, devices, and manufacturing processes including graphene oxide with hydrophilic functional groups. Disclosed are a composition comprising graphene oxide with an average particle diameter of no more than about 1 µm and has an oxygen atomic percentage of at least about 30%, a membrane comprising the composition, a water-permeable device comprising the membrane, a method of making the membrane using the composition, and several methods of generating the composition.

20 Claims, 9 Drawing Sheets

(51) Int. Cl.
  B01D 69/02 (2006.01)
  B01D 69/08 (2006.01)
  B01D 69/10 (2006.01)
  B01D 69/12 (2006.01)
  B01D 69/14 (2006.01)
  B01D 71/34 (2006.01)
  B01D 71/68 (2006.01)
  C01B 32/198 (2017.01)
  C02F 1/44 (2023.01)

(52) U.S. Cl.
  CPC ......... B01D 69/08 (2013.01); B01D 69/1071 (2022.08); B01D 69/12 (2013.01); B01D 69/148 (2013.01); B01D 71/34 (2013.01); B01D 71/68 (2013.01); C01B 32/198 (2017.08); C02F 1/44 (2013.01); *B01D 2323/081* (2022.08); *B01D 2323/12* (2013.01); *B01D 2325/02832* (2022.08); *B01D 2325/02833* (2022.08); *B01D 2325/20* (2013.01); *B01D 2325/34* (2013.01); *B01D 2325/36* (2013.01); *C02F 2303/20* (2013.01)

(56) References Cited

U.S. PATENT DOCUMENTS

| | | | |
|---|---|---|---|
| 2016/0303518 | A1 | 10/2016 | Bano et al. |
| 2017/0157570 | A1 | 6/2017 | Chu et al. |
| 2018/0282164 | A1* | 10/2018 | Abdelkader ............... C25B 1/00 |
| 2019/0030493 | A1* | 1/2019 | Chowdhury ......... B01D 69/125 |
| 2019/0256701 | A1* | 8/2019 | Nakano .................... C09K 3/10 |

FOREIGN PATENT DOCUMENTS

| | | | |
|---|---|---|---|
| CN | 105664739 A | 6/2016 | |
| CN | 107638805 A | 1/2018 | |
| EP | 3206235 A1 | 8/2017 | |
| WO | WO 2011/150325 A2 | 12/2011 | |
| WO | WO-2011150325 A2 * | 12/2011 | ............ B01J 19/00 |
| WO | 2012109212 A2 | 8/2012 | |
| WO | WO 2017/077381 A2 | 5/2017 | |
| WO | 2018140423 A1 | 8/2018 | |
| WO | WO-2012109212 A2 * | 8/2018 | ............... C08F 4/00 |
| WO | 2019106344 A1 | 6/2019 | |

OTHER PUBLICATIONS

Emiru et al., "Controlled synthesis, characterization and reduction of graphene oxide: A convenient method for large scale production," Egyptian Journal of Basic and Applied Sciences, vol. 4, Issue 1, 2017, pp. 74-79, https://doi.org/10.1016/j.ejbas.2016.11.002 (Year: 2017).*
Stankovich, Synthesis and exfoliation of isocyanate-treated graphene oxide nanoplatelets, Carbon 44 (2006) 3342-3347. (Year: 2006).*
The Extended European Search Report in European Application No. 19852352.4 mailed on May 2, 2022, 9 pages.
First Office Action in Chinese Application No. 201980055329.9 mailed on Jul. 11, 2022, 16 pages.
Huang, Yifeng, New Graphene Oxide/Polyvinylidene Fluoride Composite Ultrafiltration Membrane, China Master's Theses Full-text Database, Engineering Science and Technology Series I, 2012, 74 pages.
Fu, Changjing et al., Chapter 3 Graphene-based Hybrid Materials, The Preparation, Structure and Application of Graphene, 2017, 24 pages.
Translated by Wang, Yongliang et al., Chapter 3 Preparation Graphene by Chemical Method, Properties, Preparation, Characterization and Devices of Graphene, 2019, 16 pages.
Prawit Nuengmatcha et al., Optimization Study of Graphene Oxide Synthesis with Improvement of C/O Ratio, Asian Journal of Chemistry, 26(5): 1321-1323, 2014.
Meng, Na, Preparation of polymer/graphene oxide nanocomposite membrane and study on its separation performance, Chinese Doctoral Dissertations Full-text Database Engineering Science and Technology I, 2017, 18 pages.

* cited by examiner

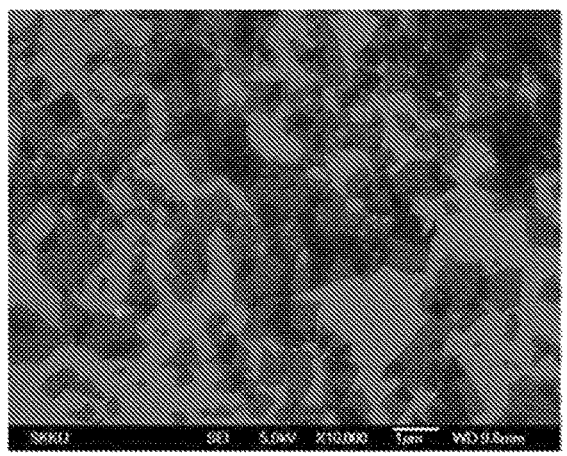 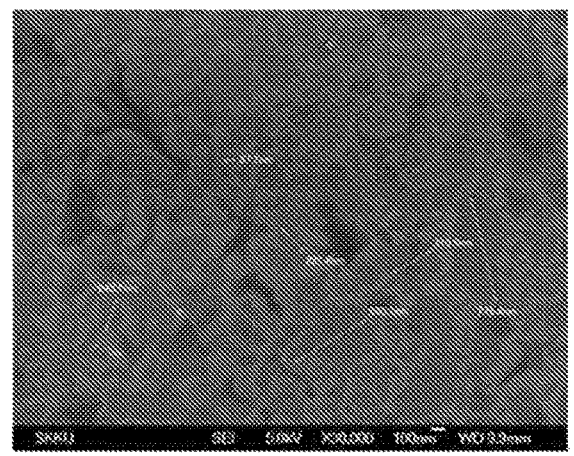
Figure 2A    Figure 2B
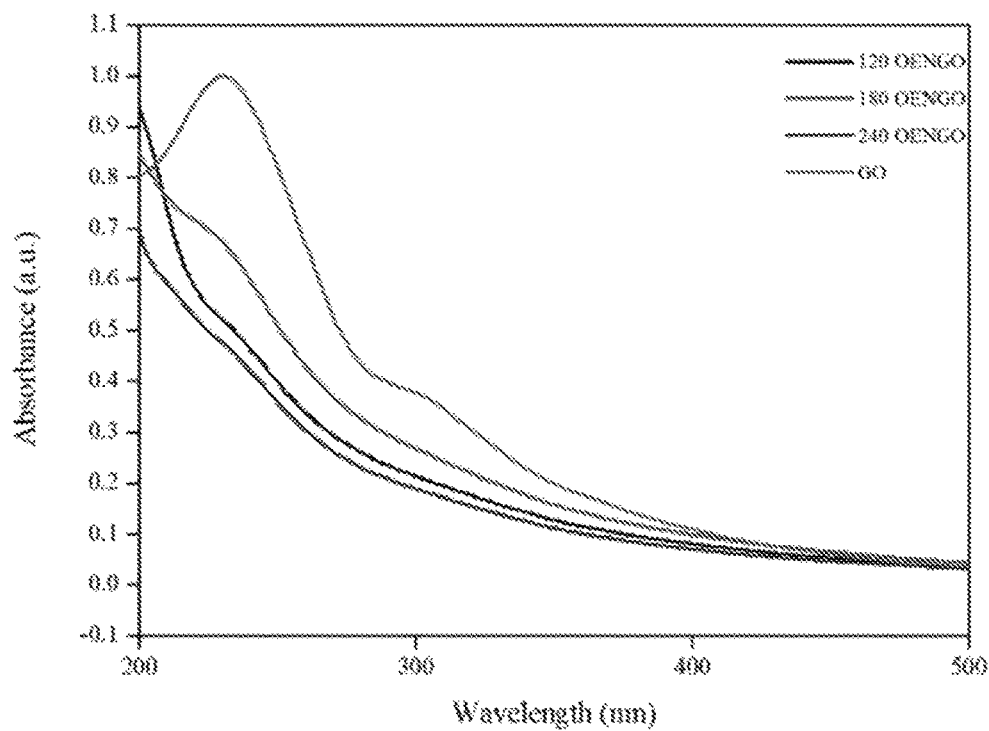
FIG. 3

DEVICES AND METHODS FOR WATER FILTRATION MEMBRANE

CROSS-REFERENCE TO RELATED APPLICATIONS

This application is a U.S. National Stage Application under 35 U.S.C. § 371 of International Application No. PCT/US2019/047450, filed Aug. 21, 2019, which claims the benefit of priority to U.S. Application No. 62/722,336, filed Aug. 24, 2018, the disclosures of which are hereby incorporated by reference in their entireties for all purposes.

TECHNICAL FIELD

The present disclosure relates generally to devices and methods for water treatment and, more particularly, to water-filtration membranes, devices, and manufacturing processes including graphene oxide with hydrophilic functional groups.

BACKGROUND OF THE INVENTION

Membrane technology is favored over other technologies in water treatment applications such as disinfection, distillation, or media filtration, because it generally requires no chemical additives, thermal inputs, or regeneration of spent media. The operation cost for membrane technology is relatively high, however, due to its short lifespan and fast deterioration in properties, which can be a result of the membrane fouling. The water flux through the membrane would significantly decrease either when the pores within the membrane are blocked or plugged, or when a polarized concentration or cake layer is formed on the membrane surface.

Antifouling features for conventional water-filtration membranes still remain to be improved. Contamination or bio-organisms can attach easily on the membrane surface as a result of its hydrophobicity. Adding graphene oxide with hydrophilic functional groups into the water-filtration membrane can potentially be an effective solution for antifouling by enhancing membrane hydrophilicity. Graphene oxide obtained by conventional processes is usually either oversized or non-uniformly dispersed, resulting in uneven distribution of pore size and/or porosity in the membrane. Also, graphene oxide obtained by conventional processes does not contain enough hydrophilic functional groups, which limits the membrane hydrophilicity. These factors are major bottle necks to be solved before graphene-integrated water filtration membranes can realize their commercial potential.

SUMMARY OF THE INVENTION

Disclosed are several new methods of synthesizing oxygen-enriched graphene oxide, which is monolayer graphene oxide that can contain high percentages of hydrophilic functional groups. Methods of mixing and dispersion of the oxygen-enriched graphene oxide into various water-filtration membrane products with a high degree of uniformity are also disclosed. These methods can significantly improve the hydrophilicity and water flux of membranes. They can also improve membrane antifouling and anti-biofouling features, and thus extend the membrane cleaning periods and reduce the operation cost of water treatment. In addition, methods of using saccharides as raw materials provide an environment-friendly, impurity-free, and low-cost way of mass producing graphene oxide.

Further disclosed are compositions, membranes, devices, and methods of making graphene oxide-containing water-filtration systems.

In one aspect, disclosed is a composition comprising graphene oxide, in which the graphene oxide has an average particle diameter of no more than about 2 μm and has an oxygen atomic percentage of at least about 30%. In some cases, the graphene oxide has an average particle diameter of no more than about 1 μm. In some cases, the graphene oxide has an average particle diameter of about 0.001 μm to about 2 μm. In some cases, the graphene oxide has an average particle diameter of at least about 0.001 μm. In some cases, the graphene oxide has an average particle diameter of at most about 2 μm. In some cases, the graphene oxide has an average particle diameter of at most about 1.5 μm. In some cases, the graphene oxide has an average particle diameter of at most about 1 μm. In some cases, the graphene oxide has an average particle diameter of at most about 0.5 μm. In some cases, the graphene oxide has an average particle diameter of at most about 0.2 μm. In some cases, the graphene oxide has an average particle diameter of at most about 0.1 μm. In some cases, the graphene oxide has an average particle diameter of at most about 0.05 μm. In some cases, the graphene oxide has an average particle diameter of at most about 0.01 μm. In some cases, the graphene oxide has an average particle diameter of about 2 μm to about 1.5 μm, about 2 μm to about 1 μm, about 2 μm to about 0.5 μm, about 2 μm to about 0.2 μm, about 2 μm to about 0.1 μm, about 2 μm to about 0.05 μm, about 2 μm to about 0.01 μm, about 2 μm to about 0.005 μm, about 2 μm to about 0.001 μm, about 1.5 μm to about 1 μm, about 1.5 μm to about 0.5 μm, about 1.5 μm to about 0.2 μm, about 1.5 μm to about 0.1 μm, about 1.5 μm to about 0.05 μm, about 1.5 μm to about 0.01 μm, about 1.5 μm to about 0.005 μm, about 1.5 μm to about 0.001 μm, about 1 μm to about 0.5 μm, about 1 μm to about 0.2 μm, about 1 μm to about 0.1 μm, about 1 μm to about 0.05 μm, about 1 μm to about 0.01 μm, about 1 μm to about 0.005 μm, about 1 μm to about 0.001 μm, about 0.5 μm to about 0.2 μm, about 0.5 μm to about 0.1 μm, about 0.5 μm to about 0.05 μm, about 0.5 μm to about 0.01 μm, about 0.5 μm to about 0.005 μm, about 0.5 μm to about 0.001 μm, about 0.2 μm to about 0.1 μm, about 0.2 μm to about 0.05 μm, about 0.2 μm to about 0.01 μm, about 0.2 μm to about 0.005 μm, about 0.2 μm to about 0.001 μm, about 0.1 μm to about 0.05 μm, about 0.1 μm to about 0.01 μm, about 0.1 μm to about 0.005 μm, about 0.1 μm to about 0.001 μm, about 0.05 μm to about 0.01 μm, about 0.05 μm to about 0.005 μm, about 0.05 μm to about 0.001 μm, about 0.01 μm to about 0.005 μm, about 0.01 μm to about 0.001 μm, or about 0.005 μm to about 0.001 μm. In some cases, the graphene oxide has an average particle diameter of about 2 μm, about 1.5 μm, about 1 μm, about 0.5 μm, about 0.2 μm, about 0.1 μm, about 0.05 μm, about 0.01 μm, about 0.005 μm, or about 0.001 μm. In some cases, the average diameter of the graphene oxide is no more than about 100 nm. In some cases, the average diameter of the graphene oxide is from about 10 nm to about 100 nm.

In some cases, the graphene oxide has an oxygen atomic percentage of about 30% to about 70%. In some cases, the graphene oxide has an oxygen atomic percentage of at least about 30%. In some cases, the graphene oxide has an oxygen atomic percentage of at most about 70%. In some cases, the graphene oxide has an oxygen atomic percentage of about 30% to about 35%, about 30% to about 40%, about 30% to about 45%, about 30% to about 50%, about 30% to about 55%, about 30% to about 60%, about 30% to about 65%, about 30% to about 70%, about 35% to about 40%, about 35% to about 45%, about 35% to about 50%, about 35% to about 55%, about 35% to about 60%, about 35% to about 65%, about 35% to about 70%, about 40% to about 45%, about 40% to about 50%, about 40% to about 55%, about 40% to about 60%, about 40% to about 65%, about 40% to about 70%, about 45% to about 50%, about 45% to about 55%, about 45% to about 60%, about 45% to about 65%, about 45% to about 70%, about 50% to about 55%, about 50% to about 60%, about 50% to about 65%, about 50% to about 70%, about 55% to about 60%, about 55% to about 65%, about 55% to about 70%, about 60% to about 65%, about 60% to about 70%, or about 65% to about 70%. In some cases, the graphene oxide has an oxygen atomic percentage of about 30%, about 35%, about 40%, about 45%, about 50%, about 55%, about 60%, about 65%, or about 70%. In some cases, the oxygen atomic percentage is at least 35%. In some cases, the oxygen atomic percentage is from about 35% to about 50%.

In some cases, the graphene oxide has a lower absorbance level at 230 nm wavelength than a graphene oxide having an average diameter of more than 1 μm. For example, the absorbance level at a 230 nm wavelength can be at least 10%, 15%, 20%, 25%, 30%, 35%, 40%, 45%, or 50% lower than the graphene oxide having an average diameter of more than 1 μm. In some cases, the graphene oxide has a lower absorbance level at a 230 nm wavelength than a graphene oxide having an average diameter of more than 2 μm. For example, the absorbance level at a 230 nm wavelength can be at least 10%, 15%, 20%, 25%, 30%, 35%, 40%, 45%, or 50% lower than the graphene oxide having an average diameter of more than 2 μm. In some cases, the graphene oxide has a lower absorbance level at a 230 nm wavelength than a graphene oxide having an average diameter of more than 5 μm. For example, the absorbance level at 230 nm wavelength can be at least 10%, 15%, 20%, 25%, 30%, 35%, 40%, 45%, or 50% lower than the graphene oxide having an average diameter of more than 5 μm. In some cases, the graphene oxide has a lower absorbance level at a 230 nm wavelength than a graphene oxide having an average diameter of more than 10 μm. For example, the absorbance level at a 230 nm wavelength can be at least 10%, 15%, 20%, 25%, 30%, 35%, 40%, 45%, or 50% lower than the graphene oxide having an average diameter of more than 10 μm.

In some cases, the graphene oxide has a lower absorbance level at 230 nm wavelength than a graphene oxide having an oxygen atomic percentage of less than 30%. For example, the absorbance level at a 230 nm wavelength can be at least 10%, 15%, 20%, 25%, 30%, 35%, 40%, 45%, or 50% lower than the graphene oxide having an oxygen atomic percentage of less than 30%. In some cases, the graphene oxide has a lower absorbance level at a 230 nm wavelength than a graphene oxide having an oxygen atomic percentage of less than 20%. For example, the absorbance level at a 230 nm wavelength can be at least 10%, 15%, 20%, 25%, 30%, 35%, 40%, 45%, or 50% lower than the graphene oxide having an oxygen atomic percentage of less than 20%. In some cases, the graphene oxide has a lower absorbance level at a 230 nm wavelength than a graphene oxide having an oxygen atomic percentage of less than 10%. For example, the absorbance level at a 230 nm wavelength can be at least 10%, 15%, 20%, 25%, 30%, 35%, 40%, 45%, or 50% lower than the graphene oxide having an oxygen atomic percentage of less than 10%.

In some cases, the graphene oxide has a lower absorbance level at a 230 nm wavelength than a graphene oxide made with a lower amount of $H_2SO_4$. For example, the absorbance level at a 230 nm wavelength is at least 10%, 15%, 20%, 25%, 30%, 35%, 40%, 45%, or 50% lower than the graphene oxide made with a lower amount of $H_2SO_4$.

In some cases, the composition further comprises sulfuric acid. In some cases, the composition further comprises an oxidizing agent. In some cases, the oxidizing agent comprises oxygen ($O_2$), ozone ($O_3$), hydrogen peroxide ($H_2O_2$), Fenton's reagent, fluorine ($F_2$), chlorine ($Cl_2$), bromine ($Br_2$), iodine ($I_2$), nitric acid ($HNO_3$), sulfuric acid ($H_2SO_4$), peroxydisulfuric acid ($H_2S_2O_8$), peroxymonosulfuric acid ($H_2SO_5$), chlorite, chlorate, perchlorate, hypochlorite, bleach (NaClO), chromic acid, dichromic acid, chromium trioxide, pyridinium chlorochromate (PCC), potassium permanganate, sodium perborate, nitrous oxide ($N_2O$), nitrogen dioxide ($NO_2$), dinitrogen tetroxide ($N_2O_4$), potassium nitrate ($KNO_3$), sodium bismuthate, or any combination thereof. In some cases, the oxidizing agent comprises hydrogen peroxide. In some cases, the oxidizing agent comprises potassium permanganate.

In some cases, the composition further comprises an organic solvent. In some cases, the organic solvent comprises a nonpolar solvent, a polar aprotic solvent, a polar protic solvent, or any combination thereof. In some cases, the nonpolar solvent comprises pentane, cyclopentane, hexane, cyclohexane, benzene, toluene, 1,4-dioxane, chloroform, diethyl ether, dichloromethane (DCM), or any combination thereof. In some cases, the polar aprotic solvent comprises tetrahydrofuran (THF), ethyl acetate, acetone, dimethylformamide (DMF), acetonitrile (MeCN), dimethyl sulfoxide (DMSO), nitromethane, propylene carbonate, or any combination thereof. In some cases, the polar protic solvent comprises formic acid, n-butanol, isopropyl alcohol (IPA), n-propanol, ethanol, methanol, acetic acid, or any combination thereof. In some cases, the organic solvent comprises N,N-dimethylacetamide (DMAC), N-methyl-2-pyrrolidone (NMP), dimethyl formamide (DMF), or any combination thereof. In some cases, the organic solvent comprises an alkane, a cycloalkanone, or both. In some cases, the cycloalkanone comprises hexane, isoparaffin, light alkylate naphtha, cyclohexanone, or any combination thereof.

In some cases, the composition further comprises an inorganic solvent.

In some cases, the composition further comprises a polymer. In some cases, the polymer comprises polyvinylidene fluoride (PVDF). In some cases, the PVDF has an average molecular weight of about 50,000 to about 1,000,000. In some cases, the PVDF has an average molecular weight of at least about 50,000. In some cases, the PVDF has an average molecular weight of at most about 1,000,000. In some cases, the PVDF has an average molecular weight of about 50,000 to about 100,000, about 50,000 to about 300,000, about 50,000 to about 500,000, about 50,000 to about 700,000, about 50,000 to about 800,000, about 50,000 to about 1,000,000, about 100,000 to about 300,000, about 100,000 to about 500,000, about 100,000 to about 700,000, about 100,000 to about 800,000, about 100,000 to about 1,000,000, about 300,000 to about 500,000, about 300,000 to about 700,000, about 300,000 to about 800,000, about 300,000 to about 1,000,000, about 500,000 to about 700,000, about 500,000 to about 800,000, about 500,000 to about 1,000,000, about 700,000 to about 800,000, about 700,000 to about 1,000,000, or about 800,000 to about 1,000,000. In some cases, the PVDF has an average molecular weight of about 50,000, about 100,000, about 300,000, about 500,000, about 700,000, about 800,000, or about 1,000,000. In some cases, the polyvinylidene fluoride (PVDF) has an average molecular weight of at least about 100,000. In some cases, the average molecular weight is from about 300,000 to about 700,000.

In some cases, the polyvinylidene fluoride (PVDF) is about 5% (w/w) of the composition to about 40% (w/w) of the composition. In some cases, the polyvinylidene fluoride (PVDF) is at least about 5% (w/w) of the composition. In some cases, the polyvinylidene fluoride (PVDF) is at most about 40% (w/w) of the composition. In some cases, the polyvinylidene fluoride (PVDF) is about 5% (w/w) of the composition to about 10% (w/w) of the composition, about 5% (w/w) of the composition to about 20% (w/w) of the composition, about 5% (w/w) of the composition to about 30% (w/w) of the composition, about 5% (w/w) of the composition to about 40% (w/w) of the composition, about 10% (w/w) of the composition to about 20% (w/w) of the composition, about 10% (w/w) of the composition to about 30% (w/w) of the composition, about 10% (w/w) of the composition to about 40% (w/w) of the composition, about 20% (w/w) of the composition to about 30% (w/w) of the composition, about 20% (w/w) of the composition to about 40% (w/w) of the composition, or about 30% (w/w) of the composition to about 40% (w/w) of the composition. In some cases, the polyvinylidene fluoride (PVDF) is about 5% (w/w) of the composition, about 10% (w/w) of the composition, about 20% (w/w) of the composition, about 30% (w/w) of the composition, or about 40% (w/w) of the composition. In some cases, the polyvinylidene fluoride (PVDF) is from about 10% to about 30% (w/w) of the composition.

In some cases, the polymer comprises poly(vinyl pyrrolidone) (PVP having a molecular weight, Mw, of between 8-2,000 kDa), triethyl phosphate (TEP), ethylene glycol (EG), perfluorosulfonic acid, or any combination thereof. In some cases, the polymer is about 1% (w/w) of the composition to about 10% (w/w) of the composition. In some cases, the polymer is at least about 1% (w/w) of the composition. In some cases, the polymer is at most about 10% (w/w) of the composition. In some cases, the polymer is about 1% (w/w) of the composition to about 3% (w/w) of the composition, about 1% (w/w) of the composition to about 5% (w/w) of the composition, about 1% (w/w) of the composition to about 8% (w/w) of the composition, about 1% (w/w) of the composition to about 10% (w/w) of the composition, about 3% (w/w) of the composition to about 5% (w/w) of the composition, about 3% (w/w) of the composition to about 8% (w/w) of the composition, about 3% (w/w) of the composition to about 10% (w/w) of the composition, about 5% (w/w) of the composition to about 8% (w/w) of the composition, about 5% (w/w) of the composition to about 10% (w/w) of the composition, or about 8% (w/w) of the composition to about 10% (w/w) of the composition. In some cases, the polymer is about 1% (w/w) of the composition, about 3% (w/w) of the composition, about 5% (w/w) of the composition, about 8% (w/w) of the composition, or about 10% (w/w) of the composition. In some cases, the polymer is from about 1% to about 8% (w/w) of the composition.

In some cases, the composition further comprises polyvinyl alcohol (PVA), glutaraldehyde, dichloromethane, octadecyltrichlorosilane (ODS), hydrochloric acid (HC), or any combination thereof.

In some cases, the composition further comprises triethylamine (TEA), camphor sulfonic acid (CSA), dimethyl sulfoxide (DMSO), m-phenylene diamine (MPD), 2-ethyl-1,3-hexane diol (EHD), sodium lauryl sulfate (SLES), or any combination thereof. In some cases, the composition comprises about 1% (w/w) of the TEA to about 5% (w/w) of the TEA. In some cases, the composition comprises at least about 1% (w/w) of the TEA. In some cases, the composition comprises at most about 5% (w/w) of the TEA. In some cases, the composition comprises about 1% (w/w) of the TEA to about 2% (w/w) of the TEA, about 1% (w/w) of the TEA to about 3% (w/w) of the TEA, about 1% (w/w) of the TEA to about 4% (w/w) of the TEA, about 1% (w/w) of the TEA to about 5% (w/w) of the TEA, about 2% (w/w) of the TEA to about 3% (w/w) of the TEA, about 2% (w/w) of the TEA to about 4% (w/w) of the TEA, about 2% (w/w) of the TEA to about 5% (w/w) of the TEA, about 3% (w/w) of the TEA to about 4% (w/w) of the TEA, about 3% (w/w) of the TEA to about 5% (w/w) of the TEA, or about 4% (w/w) of the TEA to about 5% (w/w) of the TEA. In some cases, the composition comprises about 1% (w/w) of the TEA, about 2% (w/w) of the TEA, about 3% (w/w) of the TEA, about 4% (w/w) of the TEA, or about 5% (w/w) of the TEA.

In some cases, the composition comprises about 1% (w/w) of the CSA to about 7% (w/w) of the CSA. In some cases, the composition comprises at least about 1% (w/w) of the CSA. In some cases, the composition comprises at most about 7% (w/w) of the CSA. In some cases, the composition comprises about 1% (w/w) of the CSA to about 3% (w/w) of the CSA, about 1% (w/w) of the CSA to about 5% (w/w) of the CSA, about 1% (w/w) of the CSA to about 7% (w/w) of the CSA, about 3% (w/w) of the CSA to about 5% (w/w) of the CSA, about 3% (w/w) of the CSA to about 7% (w/w) of the CSA, or about 5% (w/w) of the CSA to about 7% (w/w) of the CSA. In some cases, the composition comprises about 1% (w/w) of the CSA, about 3% (w/w) of the CSA, about 5% (w/w) of the CSA, or about 7% (w/w) of the CSA.

In some cases, the composition comprises about 1% (w/w) of the DMSO to about 3% (w/w) of the DMSO. In some cases, the composition comprises at least about 1% (w/w) of the DMSO. In some cases, the composition comprises at most about 3% (w/w) of the DMSO. In some cases, the composition comprises about 1% (w/w) of the DMSO to about 1.5% (w/w) of the DMSO, about 1% (w/w) of the DMSO to about 2% (w/w) of the DMSO, about 1% (w/w) of the DMSO to about 2.5% (w/w) of the DMSO, about 1% (w/w) of the DMSO to about 3% (w/w) of the DMSO, about 1.5% (w/w) of the DMSO to about 2% (w/w) of the DMSO, about 1.5% (w/w) of the DMSO to about 2.5% (w/w) of the DMSO, about 1.5% (w/w) of the DMSO to about 3% (w/w) of the DMSO, about 2% (w/w) of the DMSO to about 2.5% (w/w) of the DMSO, about 2% (w/w) of the DMSO to about 3% (w/w) of the DMSO, or about 2.5% (w/w) of the DMSO to about 3% (w/w) of the DMSO. In some cases, the composition comprises about 1% (w/w) of the DMSO, about 1.5% (w/w) of the DMSO, about 2% (w/w) of the DMSO, about 2.5% (w/w) of the DMSO, or about 3% (w/w) of the DMSO.

In some cases, the composition comprises about 0.2% (w/w) of the MPD to about 4% (w/w) of the MPD. In some cases, the composition comprises at least about 0.2% (w/w) of the MPD. In some cases, the composition comprises at most about 4% (w/w) of the MPD. In some cases, the composition comprises about 0.2% (w/w) of the MPD to about 1% (w/w) of the MPD, about 0.2% (w/w) of the MPD to about 2% (w/w) of the MPD, about 0.2% (w/w) of the MPD to about 3% (w/w) of the MPD, about 0.2% (w/w) of the MPD to about 4% (w/w) of the MPD, about 1% (w/w) of the MPD to about 2% (w/w) of the MPD, about 1% (w/w) of the MPD to about 3% (w/w) of the MPD, about 1% (w/w) of the MPD to about 4% (w/w) of the MPD, about 2% (w/w) of the MPD to about 3% (w/w) of the MPD, about 2% (w/w)

of the MPD to about 4% (w/w) of the MPD, or about 3% (w/w) of the MPD to about 4% (w/w) of the MPD. In some cases, the composition comprises about 0.2% (w/w) of the MPD, about 1% (w/w) of the MPD, about 2% (w/w) of the MPD, about 3% (w/w) of the MPD, or about 4% (w/w) of the MPD.

In some cases, the composition comprises about 0.1% (w/w) of the EHD to about 0.5% (w/w) of the EHD. In some cases, the composition comprises at least about 0.1% (w/w) of the EHD. In some cases, the composition comprises at most about 0.5% (w/w) of the EHD. In some cases, the composition comprises about 0.1% (w/w) of the EHD to about 0.2% (w/w) of the EHD, about 0.1% (w/w) of the EHD to about 0.3% (w/w) of the EHD, about 0.1% (w/w) of the EHD to about 0.4% (w/w) of the EHD, about 0.1% (w/w) of the EHD to about 0.5% (w/w) of the EHD, about 0.2% (w/w) of the EHD to about 0.3% (w/w) of the EHD, about 0.2% (w/w) of the EHD to about 0.4% (w/w) of the EHD, about 0.2% (w/w) of the EHD to about 0.5% (w/w) of the EHD, about 0.3% (w/w) of the EHD to about 0.4% (w/w) of the EHD, about 0.3% (w/w) of the EHD to about 0.5% (w/w) of the EHD, or about 0.4% (w/w) of the EHD to about 0.5% (w/w) of the EHD. In some cases, the composition comprises about 0.1% (w/w) of the EHD, about 0.2% (w/w) of the EHD, about 0.3% (w/w) of the EHD, about 0.4% (w/w) of the EHD, or about 0.5% (w/w) of the EHD.

In some cases, the composition comprises about 0.1% (w/w) of the SLES to about 0.5% (w/w) of the SLES. In some cases, the composition comprises at least about 0.1% (w/w) of the SLES. In some cases, the composition comprises at most about 0.5% (w/w) of the SLES. In some cases, the composition comprises about 0.1% (w/w) of the SLES to about 0.2% (w/w) of the SLES, about 0.1% (w/w) of the SLES to about 0.3% (w/w) of the SLES, about 0.1% (w/w) of the SLES to about 0.4% (w/w) of the SLES, about 0.1% (w/w) of the SLES to about 0.5% (w/w) of the SLES, about 0.2% (w/w) of the SLES to about 0.3% (w/w) of the SLES, about 0.2% (w/w) of the SLES to about 0.4% (w/w) of the SLES, about 0.2% (w/w) of the SLES to about 0.5% (w/w) of the SLES, about 0.3% (w/w) of the SLES to about 0.4% (w/w) of the SLES, about 0.3% (w/w) of the SLES to about 0.5% (w/w) of the SLES, or about 0.4% (w/w) of the SLES to about 0.5% (w/w) of the SLES. In some cases, the composition comprises about 0.1% (w/w) of the SLES, about 0.2% (w/w) of the SLES, about 0.3% (w/w) of the SLES, about 0.4% (w/w) of the SLES, or about 0.5% (w/w) of the SLES.

In some cases, the composition further comprises 1,3,5-benzenetricarbonyl trichloride (TMC), tributyl phosphate (TBP), or any combination thereof.

In some cases, the composition comprises about 0.01% (w/w) of the TMC to about 0.1% (w/w) of the TMC. In some cases, the composition comprises at least about 0.01% (w/w) of the TMC. In some cases, the composition comprises at most about 0.1% (w/w) of the TMC. In some cases, the composition comprises about 0.01% (w/w) of the TMC to about 0.05% (w/w) of the TMC, about 0.01% (w/w) of the TMC to about 0.1% (w/w) of the TMC, or about 0.05% (w/w) of the TMC to about 0.1% (w/w) of the TMC. In some cases, the composition comprises about 0.01% (w/w) of the TMC, about 0.05% (w/w) of the TMC, or about 0.1% (w/w) of the TMC.

In some cases, the composition comprises about 0.1% (w/w) of the TBP to about 0.5% (w/w) of the TBP. In some cases, the composition comprises at least about 0.1% (w/w) of the TBP. In some cases, the composition comprises at most about 0.5% (w/w) of the TBP. In some cases, the composition comprises about 0.1% (w/w) of the TBP to about 0.2% (w/w) of the TBP, about 0.1% (w/w) of the TBP to about 0.3% (w/w) of the TBP, about 0.1% (w/w) of the TBP to about 0.4% (w/w) of the TBP, about 0.1% (w/w) of the TBP to about 0.5% (w/w) of the TBP, about 0.2% (w/w) of the TBP to about 0.3% (w/w) of the TBP, about 0.2% (w/w) of the TBP to about 0.4% (w/w) of the TBP, about 0.2% (w/w) of the TBP to about 0.5% (w/w) of the TBP, about 0.3% (w/w) of the TBP to about 0.4% (w/w) of the TBP, about 0.3% (w/w) of the TBP to about 0.5% (w/w) of the TBP, or about 0.4% (w/w) of the TBP to about 0.5% (w/w) of the TBP. In some cases, the composition comprises about 0.1% (w/w) of the TBP, about 0.2% (w/w) of the TBP, about 0.3% (w/w) of the TBP, about 0.4% (w/w) of the TBP, or about 0.5% (w/w) of the TBP.

In some cases, the composition further comprises carboxyl acid, oxalic acid, citric acid, phosphoric acid, benzoic acid, dihydroxybenzene, dopamine, or any combination thereof. In some cases, the composition further comprises polyethersulfone (PES). In some cases, the PES has an average molecular weight of about 10,000 to about 80,000. In some cases, the PES has an average molecular weight of at least about 10,000. In some cases, the PES has an average molecular weight of at most about 80,000. In some cases, the PES has an average molecular weight of about 10,000 to about 20,000, about 10,000 to about 30,000, about 10,000 to about 45,000, about 10,000 to about 55,000, about 10,000 to about 68,000, about 10,000 to about 80,000, about 20,000 to about 30,000, about 20,000 to about 45,000, about 20,000 to about 55,000, about 20,000 to about 68,000, about 20,000 to about 80,000, about 30,000 to about 45,000, about 30,000 to about 55,000, about 30,000 to about 68,000, about 30,000 to about 80,000, about 45,000 to about 55,000, about 45,000 to about 68,000, about 45,000 to about 80,000, about 55,000 to about 68,000, about 55,000 to about 80,000, or about 68,000 to about 80,000. In some cases, the PES has an average molecular weight of about 10,000, about 20,000, about 30,000, about 45,000, about 55,000, about 68,000, or about 80,000.

In some cases, the PES is about 10% (w/w) of the composition to about 40% (w/w) of the composition. In some cases, the PES is at least about 10% (w/w) of the composition. In some cases, the PES is at most about 40% (w/w) of the composition. In some cases, the PES is about 10% (w/w) of the composition to about 15% (w/w) of the composition, about 10% (w/w) of the composition to about 20% (w/w) of the composition, about 10% (w/w) of the composition to about 25% (w/w) of the composition, about 10% (w/w) of the composition to about 30% (w/w) of the composition, about 10% (w/w) of the composition to about 35% (w/w) of the composition, about 10% (w/w) of the composition to about 40% (w/w) of the composition, about 15% (w/w) of the composition to about 20% (w/w) of the composition, about 15% (w/w) of the composition to about 25% (w/w) of the composition, about 15% (w/w) of the composition to about 30% (w/w) of the composition, about 15% (w/w) of the composition to about 35% (w/w) of the composition, about 15% (w/w) of the composition to about 40% (w/w) of the composition, about 20% (w/w) of the composition to about 25% (w/w) of the composition, about 20% (w/w) of the composition to about 30% (w/w) of the composition, about 20% (w/w) of the composition to about 35% (w/w) of the composition, about 20% (w/w) of the composition to about 40% (w/w) of the composition, about 25% (w/w) of the composition to about 30% (w/w) of the composition, about 25% (w/w) of the composition to about 35% (w/w) of the composition, about 25% (w/w) of the composition to about 40% (w/w) of the composition, about 30% (w/w) of the composition to about 35% (w/w) of the composition, about 30% (w/w) of the composition to about 40% (w/w) of the composition, or about 35% (w/w) of the composition to about 40% (w/w) of the composition. In some cases, the PES is about 10% (w/w) of the composition, about 15% (w/w) of the composition, about 20% (w/w) of the composition, about 25% (w/w) of the composition, about 30% (w/w) of the composition, about 35% (w/w) of the composition, or about 40% (w/w) of the composition.

In some cases, the composition further comprises a saccharide. In some cases, the saccharide comprises a monosaccharide, a disaccharide, a polysaccharide, or any combination thereof. In some cases, the saccharide comprises glucose, fructose, sucrose, or any combination thereof.

In some cases, the composition comprises about 1% (w/w) of the saccharide to about 95% (w/w) of the saccharide. In some cases, the composition comprises at least about 1% (w/w) of the saccharide. In some cases, the composition comprises at most about 95% (w/w) of the saccharide. In some cases, the composition comprises about 1% (w/w) of the saccharide to about 10% (w/w) of the saccharide, about 1% (w/w) of the saccharide to about 20% (w/w) of the saccharide, about 1% (w/w) of the saccharide to about 40% (w/w) of the saccharide, about 1% (w/w) of the saccharide to about 60% (w/w) of the saccharide, about 1% (w/w) of the saccharide to about 80% (w/w) of the saccharide, about 1% (w/w) of the saccharide to about 95% (w/w) of the saccharide, about 10% (w/w) of the saccharide to about 20% (w/w) of the saccharide, about 10% (w/w) of the saccharide to about 40% (w/w) of the saccharide, about 10% (w/w) of the saccharide to about 60% (w/w) of the saccharide, about 10% (w/w) of the saccharide to about 80% (w/w) of the saccharide, about 10% (w/w) of the saccharide to about 95% (w/w) of the saccharide, about 20% (w/w) of the saccharide to about 40% (w/w) of the saccharide, about 20% (w/w) of the saccharide to about 60% (w/w) of the saccharide, about 20% (w/w) of the saccharide to about 80% (w/w) of the saccharide, about 20% (w/w) of the saccharide to about 95% (w/w) of the saccharide, about 40% (w/w) of the saccharide to about 60% (w/w) of the saccharide, about 40% (w/w) of the saccharide to about 80% (w/w) of the saccharide, about 40% (w/w) of the saccharide to about 95% (w/w) of the saccharide, about 60% (w/w) of the saccharide to about 80% (w/w) of the saccharide, about 60% (w/w) of the saccharide to about 95% (w/w) of the saccharide, or about 80% (w/w) of the saccharide to about 95% (w/w) of the saccharide. In some cases, the composition comprises about 1% (w/w) of the saccharide, about 10% (w/w) of the saccharide, about 20% (w/w) of the saccharide, about 40% (w/w) of the saccharide, about 60% (w/w) of the saccharide, about 80% (w/w) of the saccharide, or about 95% (w/w) of the saccharide.

In another aspect, disclosed is a membrane comprising any composition disclosed in this document. In some cases, the membrane further comprises a support layer. In some cases, the support layer comprises a nonwoven fabric. In some cases, the nonwoven fabric comprises a polypropylene nonwoven fabric.

In some cases, the membrane has a water contact angle of at most about 10°, about 20°, about 30°, about 40°, about 50°, about 60°, about 70°, about 80°, or about 90°. In some cases, the water contact angle is about 10° to about 90°. In some cases, the water contact angle is about 10° to about 20°, about 10° to about 30°, about 10° to about 40°, about 10° to about 50°, about 10° to about 60°, about 10° to about 70°, about 10° to about 80°, about 10° to about 90°, about 20° to about 30°, about 20° to about 40°, about 20° to about 50°, about 20° to about 60°, about 20° to about 70°, about 20° to about 80°, about 20° to about 90°, about 30° to about 40°, about 30° to about 50°, about 30° to about 60°, about 30° to about 70°, about 30° to about 80°, about 30° to about 90°, about 40° to about 50°, about 40° to about 60°, about 40° to about 70°, about 40° to about 80°, about 40° to about 90°, about 50° to about 60°, about 50° to about 70°, about 50° to about 80°, about 50° to about 90°, about 60° to about 70°, about 60° to about 80°, about 60° to about 90°, about 70° to about 80°, about 70° to about 90°, or about 80° to about 90°. In some cases, the water contact angle is about 10°, about 20°, about 30°, about 40°, about 50°, about 60°, about 70°, about 80°, or about 90°. In some cases, the water contact angle is smaller than 80°. In some cases, the water contact angle is from about 40° to about 60°.

In some cases, the membrane has an average surface pore diameter of about 1 nm to about 120 nm. In some cases, the membrane has an average surface pore diameter of at least about 1 nm. In some cases, the membrane has an average surface pore diameter of at most about 120 nm. In some cases, the membrane has an average surface pore diameter of about 1 nm to about 2 nm, about 1 nm to about 5 nm, about 1 nm to about 8 nm, about 1 nm to about 10 nm, about 1 nm to about 40 nm, about 1 nm to about 80 nm, about 1 nm to about 120 nm, about 2 nm to about 5 nm, about 2 nm to about 8 nm, about 2 nm to about 10 nm, about 2 nm to about 40 nm, about 2 nm to about 80 nm, about 2 nm to about 120 nm, about 5 nm to about 8 nm, about 5 nm to about 10 nm, about 5 nm to about 40 nm, about 5 nm to about 80 nm, about 5 nm to about 120 nm, about 8 nm to about 10 nm, about 8 nm to about 40 nm, about 8 nm to about 80 nm, about 8 nm to about 120 nm, about 10 nm to about 40 nm, about 10 nm to about 80 nm, about 10 nm to about 120 nm, about 40 nm to about 80 nm, about 40 nm to about 120 nm, or about 80 nm to about 120 nm. In some cases, the membrane has an average surface pore diameter of about 1 nm, about 2 nm, about 5 nm, about 8 nm, about 10 nm, about 40 nm, about 80 nm, or about 120 nm. In some cases, the membrane has an average surface pore diameter of at least 1 nm. In some cases, the average surface pore diameter is from about 2 nm to about 8 nm. In some cases, the average surface pore diameter is from about 10 nm to about 80 nm.

In some cases, the membrane has a porosity of about 50% to about 95%. In some cases, the membrane has a porosity of at least about 50%. In some cases, the membrane has a porosity of at most about 95%. In some cases, the membrane has a porosity of about 50% to about 60%, about 50% to about 70%, about 50% to about 80%, about 50% to about 85%, about 50% to about 90%, about 50% to about 95%, about 60% to about 70%, about 60% to about 80%, about 60% to about 85%, about 60% to about 90%, about 60% to about 95%, about 70% to about 80%, about 70% to about 85%, about 70% to about 90%, about 70% to about 95%, about 80% to about 85%, about 80% to about 90%, about 80% to about 95%, about 85% to about 90%, about 85% to about 95%, or about 90% to about 95%. In some cases, the membrane has a porosity of about 50%, about 60%, about 70%, about 80%, about 85%, about 90%, or about 95%. In some cases, the membrane has a porosity of at least 50%. In some cases, the porosity is from about 70% to about 85%.

In some cases, the membrane has a water permeability of about 100 LMH/bar to about 800 LMH/bar. In some cases, the membrane has a water permeability of at least about 100 LMH/bar. In some cases, the membrane has a water permeability of at most about 800 LMH/bar. In some cases, the membrane has a water permeability of about 100 LMH/bar to about 200 LMH/bar, about 100 LMH/bar to about 300 LMH/bar, about 100 LMH/bar to about 400 LMH/bar, about 100 LMH/bar to about 500 LMH/bar, about 100 LMH/bar to about 600 LMH/bar, about 100 LMH/bar to about 700 LMH/bar, about 100 LMH/bar to about 800 LMH/bar, about 200 LMH/bar to about 300 LMH/bar, about 200 LMH/bar to about 400 LMH/bar, about 200 LMH/bar to about 500 LMH/bar, about 200 LMH/bar to about 600 LMH/bar, about 200 LMH/bar to about 700 LMH/bar, about 200 LMH/bar to about 800 LMH/bar, about 300 LMH/bar to about 400 LMH/bar, about 300 LMH/bar to about 500 LMH/bar, about 300 LMH/bar to about 600 LMH/bar, about 300 LMH/bar to about 700 LMH/bar, about 300 LMH/bar to about 800 LMH/bar, about 400 LMH/bar to about 500 LMH/bar, about 400 LMH/bar to about 600 LMH/bar, about 400 LMH/bar to about 700 LMH/bar, about 400 LMH/bar to about 800 LMH/bar, about 500 LMH/bar to about 600 LMH/bar, about 500 LMH/bar to about 700 LMH/bar, about 500 LMH/bar to about 800 LMH/bar, about 600 LMH/bar to about 700 LMH/bar, about 600 LMH/bar to about 800 LMH/bar, or about 700 LMH/bar to about 800 LMH/bar. In some cases, the membrane has a water permeability of about 100 LMH/bar, about 200 LMH/bar, about 300 LMH/bar, about 400 LMH/bar, about 500 LMH/bar, about 600 LMH/bar, about 700 LMH/bar, or about 800 LMH/bar. In some cases, the membrane has a water permeability of at least 200 LMH/bar. In some cases, the water permeability is from about 500 LMH/bar to about 600 LMH/bar. In some cases, the membrane has a water permeability of at least 2 LMH/bar at 15.5 bar using a 2,000 ppm sodium chloride solution.

In some cases, the membrane has a desalinization ratio of about 60% to about 99%. In some cases, the membrane has a desalinization ratio of at least about 60%. In some cases, the membrane has a desalinization ratio of at most about 99%. In some cases, the membrane has a desalinization ratio of about 60% to about 80%, about 60% to about 90%, about 60% to about 95%, about 60% to about 99%, about 80% to about 90%, about 80% to about 95%, about 80% to about 99%, about 90% to about 95%, about 90% to about 99%, or about 95% to about 99%. In some cases, the membrane has a desalinization ratio of about 60%, about 80%, about 90%, about 95%, or about 99%. In some cases, the membrane has a desalinization ratio of at least 80%.

In another aspect, disclosed is a water-permeable device comprising any membrane disclosed in this document.

In another aspect, disclosed is a method comprising: contacting a graphite powder with an oxidizing agent to generate a composition including graphene oxide, in which the graphene oxide has an average particle diameter of no more than about 1 μm and has an oxygen atomic percentage of at least about 30%. In some cases, the graphene oxide has an average particle diameter of about 0.001 μm to about 2 μm. In some cases, the graphene oxide has an average particle diameter of at least about 0.001 μm. In some cases, the graphene oxide has an average particle diameter of at most about 2 μm. In some cases, the graphene oxide has an average particle diameter of at most about 1.5 μm. In some cases, the graphene oxide has an average particle diameter of at most about 1 μm. In some cases, the graphene oxide has an average particle diameter of at most about 0.5 μm. In some cases, the graphene oxide has an average particle diameter of at most about 0.2 μm. In some cases, the graphene oxide has an average particle diameter of at most about 0.1 μm. In some cases, the graphene oxide has an average particle diameter of at most about 0.05 μm. In some cases, the graphene oxide has an average particle diameter of at most about 0.01 μm. In some cases, the graphene oxide has an average particle diameter of about 2 μm to about 1.5 μm, about 2 μm to about 1 μm, about 2 μm to about 0.5 μm, about 2 μm to about 0.2 μm, about 2 μm to about 0.1 μm, about 2 μm to about 0.05 μm, about 2 μm to about 0.01 μm, about 2 μm to about 0.005 μm, about 2 μm to about 0.001 μm, about 1.5 μm to about 1 μm, about 1.5 μm to about 0.5 μm, about 1.5 μm to about 0.2 μm, about 1.5 μm to about 0.1 μm, about 1.5 μm to about 0.05 μm, about 1.5 μm to about 0.01 μm, about 1.5 μm to about 0.005 μm, about 1.5 μm to about 0.001 μm, about 1 μm to about 0.5 μm, about 1 μm to about 0.2 μm, about 1 μm to about 0.1 μm, about 1 μm to about 0.05 μm, about 1 μm to about 0.01 μm, about 1 μm to about 0.005 μm, about 1 μm to about 0.001 μm, about 0.5 μm to about 0.2 μm, about 0.5 μm to about 0.1 μm, about 0.5 μm to about 0.05 μm, about 0.5 μm to about 0.01 μm, about 0.5 μm to about 0.005 μm, about 0.5 μm to about 0.001 μm, about 0.2 μm to about 0.1 μm, about 0.2 μm to about 0.05 μm, about 0.2 μm to about 0.01 μm, about 0.2 μm to about 0.005 μm, about 0.2 μm to about 0.001 μm, about 0.1 μm to about 0.05 μm, about 0.1 μm to about 0.01 μm, about 0.1 μm to about 0.005 μm, about 0.1 μm to about 0.001 μm, about 0.05 μm to about 0.01 μm, about 0.05 μm to about 0.005 μm, about 0.05 μm to about 0.001 μm, about 0.01 μm to about 0.005 μm, about 0.01 μm to about 0.001 μm, or about 0.005 μm to about 0.001 μm. In some cases, the graphene oxide has an average particle diameter of about 2 μm, about 1.5 μm, about 1 μm, about 0.5 μm, about 0.2 μm, about 0.1 μm, about 0.05 μm, about 0.01 μm, about 0.005 μm, or about 0.001 μm. In some cases, the composition comprising graphene oxide is any composition disclosed in this document.

In some cases, the method further comprises grinding a graphite-containing composition to generate the graphite powder, wherein the graphite powder has an average particle size of no more than about 2 μm. In some cases, the graphite powder has an average particle size of about 0.5 μm to about 3 μm. In some cases, the graphite powder has an average particle size of at least about 0.5 μm. In some cases, the graphite powder has an average particle size of at most about 3 μm. In some cases, the graphite powder has an average particle size of about 0.5 μm to about 1 μm, about 0.5 μm to about 1.5 μm, about 0.5 μm to about 2 μm, about 0.5 μm to about 2.5 μm, about 0.5 μm to about 3 μm, about 1 μm to about 1.5 μm, about 1 μm to about 2 μm, about 1 μm to about 2.5 μm, about 1 μm to about 3 μm, about 1.5 μm to about 2 μm, about 1.5 μm to about 2.5 μm, about 1.5 μm to about 3 μm, about 2 μm to about 2.5 μm, about 2 μm to about 3 μm, or about 2.5 μm to about 3 μm. In some cases, the graphite powder has an average particle size of about 0.5 μm, about 1 μm, about 1.5 μm, about 2 μm, about 2.5 μm, or about 3 μm.

In some cases, the oxidizing agent comprises oxygen ($O_2$), ozone ($O_3$), hydrogen peroxide ($H_2O_2$), Fenton's reagent, fluorine ($F_2$), chlorine ($Cl_2$), bromine ($Br_2$), iodine ($I_2$), nitric acid ($HNO_3$), sulfuric acid ($H_2SO_4$), peroxydisulfuric acid ($H_2S_2O_8$), peroxymonosulfuric acid ($H_2SO_5$), chlorite, chlorate, perchlorate, hypochlorite, bleach (NaClO), chromic acid, dichromic acid, chromium trioxide, pyridinium chlorochromate (PCC), potassium permanganate, sodium perborate, nitrous oxide ($N_2O$), nitrogen dioxide ($NO_2$), dinitrogen tetroxide ($N_2O_4$), potassium nitrate ($KNO_3$), sodium bismuthate, or any combination thereof. In some cases, the oxidizing agent comprises sulfuric acid, potassium permanganate, hydrogen peroxide, or any combination thereof.

In some cases, the method further comprises contacting the composition including graphene oxide with an organic solvent to form a mixture. In some cases, the organic solvent comprises a nonpolar solvent, a polar aprotic solvent, a polar protic solvent, or any combination thereof. In some cases, the nonpolar solvent comprises pentane, cyclopentane, hexane, cyclohexane, benzene, toluene, 1,4-dioxane, chloroform, diethyl ether, dichloromethane (DCM), or any combination thereof. In some cases, the polar aprotic solvent comprises tetrahydrofuran (THF), ethyl acetate, acetone, dimethylformamide (DMF), acetonitrile (MeCN), dimethyl sulfoxide (DMSO), nitromethane, propylene carbonate, or any combination thereof. In some cases, the polar protic solvent comprises formic acid, n-butanol, isopropyl alcohol (IPA), n-propanol, ethanol, methanol, acetic acid, or any combination thereof.

In some cases, the method further comprises separating a solid including graphene oxide from the mixture. In some cases, the separating comprises fractionation, centrifugation, filtration, or any combination thereof. In some cases, the filtering uses a pressure filter or electrodialysis.

In some cases, the method further comprises washing the solid including graphene oxide with a second organic solvent. In some cases, the second organic solvent comprises ethanol, methanol, or any combination thereof.

In some cases, the method further comprises drying the solid including graphene oxide.

In another aspect, disclosed is a method comprising: a) heating a saccharide solution to generate a solid powder; and b) contacting the solid powder with an oxidizing agent to generate a composition including graphene oxide, wherein the graphene oxide has an average particle diameter of no more than about 1 µm and has an oxygen atomic percentage of at least about 30%. In some cases, the graphene oxide has an average particle diameter of about 0.001 µm to about 2 µm. In some cases, the graphene oxide has an average particle diameter of at least about 0.001 µm. In some cases, the graphene oxide has an average particle diameter of at most about 2 µm. In some cases, the graphene oxide has an average particle diameter of at most about 1.5 µm. In some cases, the graphene oxide has an average particle diameter of at most about 1 µm. In some cases, the graphene oxide has an average particle diameter of at most about 0.5 µm. In some cases, the graphene oxide has an average particle diameter of at most about 0.2 µm. In some cases, the graphene oxide has an average particle diameter of at most about 0.1 µm. In some cases, the graphene oxide has an average particle diameter of at most about 0.05 µm. In some cases, the graphene oxide has an average particle diameter of at most about 0.01 µm. In some cases, the graphene oxide has an average particle diameter of about 2 µm to about 1.5 µm, about 2 µm to about 1 µm, about 2 µm to about 0.5 µm, about 2 µm to about 0.2 µm, about 2 µm to about 0.1 µm, about 2 µm to about 0.05 µm, about 2 µm to about 0.01 µm, about 2 µm to about 0.005 µm, about 2 µm to about 0.001 µm, about 1.5 µm to about 1 µm, about 1.5 µm to about 0.5 µm, about 1.5 µm to about 0.2 µm, about 1.5 µm to about 0.1 µm, about 1.5 µm to about 0.05 µm, about 1.5 µm to about 0.01 µm, about 1.5 µm to about 0.005 µm, about 1.5 µm to about 0.001 µm, about 1 µm to about 0.5 µm, about 1 µm to about 0.2 µm, about 1 µm to about 0.1 µm, about 1 µm to about 0.05 µm, about 1 µm to about 0.01 µm, about 1 µm to about 0.005 µm, about 1 µm to about 0.001 µm, about 0.5 µm to about 0.2 µm, about 0.5 µm to about 0.1 µm, about 0.5 µm to about 0.05 µm, about 0.5 µm to about 0.01 µm, about 0.5 µm to about 0.005 µm, about 0.5 µm to about 0.001 µm, about 0.2 µm to about 0.1 µm, about 0.2 µm to about 0.05 µm, about 0.2 µm to about 0.01 µm, about 0.2 µm to about 0.005 µm, about 0.2 µm to about 0.001 µm, about 0.1 µm to about 0.05 µm, about 0.1 µm to about 0.01 µm, about 0.1 µm to about 0.005 µm, about 0.1 µm to about 0.001 µm, about 0.05 µm to about 0.01 µm, about 0.05 µm to about 0.005 µm, about 0.05 µm to about 0.001 µm, about 0.01 µm to about 0.005 µm, about 0.01 µm to about 0.001 µm, or about 0.005 µm to about 0.001 µm. In some cases, the graphene oxide has an average particle diameter of about 2 µm, about 1.5 µm, about 1 µm, about 0.5 µm, about 0.2 µm, about 0.1 µm, about 0.05 µm, about 0.01 µm, about 0.005 µm, or about 0.001 µm. In some cases, the composition including graphene oxide is any composition disclosed in this document.

In some cases, the composition further includes a saccharide. In some cases, the saccharide comprises a monosaccharide, a disaccharide, a polysaccharide, or any combination thereof. In some cases, the saccharide comprises glucose, fructose, sucrose, or any combination thereof. In some cases, the composition comprises from about 1% to about 60% (w/w) of the saccharide.

In some cases, the method further comprises heating the saccharide solution to about 100° C. to about 250° C. In some cases, the method further comprises heating the saccharide solution to at least about 100° C. In some cases, the method further comprises heating the saccharide solution to at most about 250° C. In some cases, the method further comprises heating the saccharide solution to about 100° C. to about 150° C., about 100° C. to about 180° C., about 100° C. to about 220° C., about 100° C. to about 250° C., about 150° C. to about 180° C., about 150° C. to about 220° C., about 150° C. to about 250° C., about 180° C. to about 220° C., about 180° C. to about 250° C., or about 220° C. to about 250° C. In some cases, the method further comprises heating the saccharide solution to about 100° C., about 150° C., about 180° C., about 220° C., or about 250° C. In some cases, the method further comprises heating the saccharide solution to at least 100° C. In some cases, the method further comprises heating the saccharide solution to 180-220° C.

In some cases, the method further comprises heating the saccharide solution at a pressure of about 2 atm to about 20 atm. In some cases, the method further comprises heating the saccharide solution at a pressure of at least about 2 atm. In some cases, the method further comprises heating the saccharide solution at a pressure of at most about 20 atm. In some cases, the method further comprises heating the saccharide solution at about 2 atm to about 6 atm, about 2 atm to about 10 atm, about 2 atm to about 12 atm, about 2 atm to about 15 atm, about 2 atm to about 20 atm, about 6 atm to about 10 atm, about 6 atm to about 12 atm, about 6 atm to about 15 atm, about 6 atm to about 20 atm, about 10 atm to about 12 atm, about 10 atm to about 15 atm, about 10 atm to about 20 atm, about 12 atm to about 15 atm, about 12 atm to about 20 atm, or about 15 atm to about 20 atm. In some cases, the method further comprises heating the saccharide solution at about 2 atm, about 6 atm, about 10 atm, about 12 atm, about 15 atm, or about 20 atm. In some cases, the method further comprises heating the saccharide solution at more than 2 atm. In some cases, the method further comprises heating the saccharide solution at 12-20 atm.

In some cases, the oxidizing agent comprises oxygen ($O_2$), ozone ($O_3$), hydrogen peroxide ($H_2O_2$), Fenton's reagent, fluorine ($F_2$), chlorine ($Cl_2$), bromine ($Br_2$), iodine ($I_2$), nitric acid ($HNO_3$), sulfuric acid ($H_2SO_4$), peroxydisulfuric acid ($H_2S_2O_6$), peroxymonosulfuric acid ($H_2SO_5$), chlorite, chlorate, perchlorate, hypochlorite, bleach (NaClO), chromic acid, dichromic acid, chromium trioxide, pyridinium chlorochromate (PCC), potassium permanganate, sodium perborate, nitrous oxide ($N_2O$), nitrogen dioxide ($NO_2$), dinitrogen tetroxide ($N_2O_4$), potassium nitrate (KNO₃), sodium bismuthate, or any combination thereof. In some cases, the oxidizing agent comprises sulfuric acid, potassium permanganate, hydrogen peroxide, or any combination thereof.

In some cases, the method further comprises separating a solid including graphene oxide from the oxidizing agent. In some cases, the separating comprises fractionation, centrifugation, filtration, or any combination thereof. In some cases, the filtering uses a pressure filter or electrodialysis.

In some cases, the method further comprises washing the solid including graphene oxide with a second organic solvent. In some cases, the second organic solvent comprises ethanol, methanol, or any combination thereof.

In some cases, the method further comprises drying the solid including graphene oxide.

In another aspect, disclosed is a method comprising: a) contacting a saccharide composition with an acidic composition; and b) heating the saccharide composition to generate a composition including graphene oxide, wherein the graphene oxide has an average particle diameter of no more than about 1 μm and has an oxygen atomic percentage of at least about 30%. In some cases, the graphene oxide has an average particle diameter of about 0.001 μm to about 2 μm. In some cases, the graphene oxide has an average particle diameter of at least about 0.001 μm. In some cases, the graphene oxide has an average particle diameter of at most about 2 μm. In some cases, the graphene oxide has an average particle diameter of at most about 1.5 μm. In some cases, the graphene oxide has an average particle diameter of at most about 1 μm. In some cases, the graphene oxide has an average particle diameter of at most about 0.5 μm. In some cases, the graphene oxide has an average particle diameter of at most about 0.2 μm. In some cases, the graphene oxide has an average particle diameter of at most about 0.1 μm. In some cases, the graphene oxide has an average particle diameter of at most about 0.05 μm. In some cases, the graphene oxide has an average particle diameter of at most about 0.01 μm. In some cases, the graphene oxide has an average particle diameter of about 2 μm to about 1.5 μm, about 2 μm to about 1 μm, about 2 μm to about 0.5 μm, about 2 μm to about 0.2 μm, about 2 μm to about 0.1 μm, about 2 μm to about 0.05 μm, about 2 μm to about 0.01 μm, about 2 μm to about 0.005 μm, about 2 μm to about 0.001 μm, about 1.5 μm to about 1 μm, about 1.5 μm to about 0.5 μm, about 1.5 μm to about 0.2 μm, about 1.5 μm to about 0.1 μm, about 1.5 μm to about 0.05 μm, about 1.5 μm to about 0.01 μm, about 1.5 μm to about 0.005 μm, about 1.5 μm to about 0.001 μm, about 1 μm to about 0.5 μm, about 1 μm to about 0.2 μm, about 1 μm to about 0.1 μm, about 1 μm to about 0.05 μm, about 1 μm to about 0.01 μm, about 1 μm to about 0.005 μm, about 1 μm to about 0.001 μm, about 0.5 μm to about 0.2 μm, about 0.5 μm to about 0.1 μm, about 0.5 μm to about 0.05 μm, about 0.5 μm to about 0.01 μm, about 0.5 μm to about 0.005 μm, about 0.5 μm to about 0.001 μm, about 0.2 μm to about 0.1 μm, about 0.2 μm to about 0.05 μm, about 0.2 μm to about 0.01 μm, about 0.2 μm to about 0.005 μm, about 0.2 μm to about 0.001 μm, about 0.1 μm to about 0.05 μm, about 0.1 μm to about 0.01 μm, about 0.1 μm to about 0.005 μm, about 0.1 μm to about 0.001 μm, about 0.05 μm to about 0.01 μm, about 0.05 μm to about 0.005 μm, about 0.05 μm to about 0.001 μm, about 0.01 μm to about 0.005 μm, about 0.01 μm to about 0.001 μm, or about 0.005 μm to about 0.001 μm. In some cases, the graphene oxide has an average particle diameter of about 2 μm, about 1.5 μm, about 1 μm, about 0.5 μm, about 0.2 μm, about 0.1 μm, about 0.05 μm, about 0.01 μm, about 0.005 μm, or about 0.001 μm.

In some cases, the composition comprising graphene oxide is any composition disclosed in this document.

In some cases, the acidic composition comprises carboxyl acid, oxalic acid, citric acid, phosphoric acid, benzoic acid, dihydroxybenzene, dopamine, or any combination thereof.

In some cases, the saccharide comprises from about 1% to about 60% (w/w) of the composition including graphene oxide. In some cases, the saccharide comprises a monosaccharide, a disaccharide, a polysaccharide, or any combination thereof. In some cases, the saccharide comprises glucose, fructose, sucrose, or any combination thereof.

In some cases, the method further comprises heating the saccharide solution to about 100° C. to about 250° C. In some cases, the method further comprises heating the saccharide solution to at least about 100° C. In some cases, the method further comprises heating the saccharide solution to at most about 250° C. In some cases, the method further comprises heating the saccharide solution to about 100° C. to about 150° C., about 100° C. to about 180° C., about 100° C. to about 220° C., about 100° C. to about 250° C., about 150° C. to about 180° C., about 150° C. to about 220° C., about 150° C. to about 250° C., about 180° C. to about 220° C., about 180° C. to about 250° C., or about 220° C. to about 250° C. In some cases, the method further comprises heating the saccharide solution to about 100° C., about 150° C., about 180° C., about 220° C., or about 250° C. In some cases, the method further comprises heating the saccharide solution to at least 100° C. In some cases, the method further comprises heating the saccharide solution to 180-220° C.

In some cases, the method further comprises heating the saccharide solution at about 2 atm to about 20 atm. In some cases, the method further comprises heating the saccharide solution at a pressure of at least about 2 atm. In some cases, the method further comprises heating the saccharide solution at a pressure of at most about 20 atm. In some cases, the method further comprises heating the saccharide solution at about 2 atm to about 6 atm, about 2 atm to about 10 atm, about 2 atm to about 12 atm, about 2 atm to about 15 atm, about 2 atm to about 20 atm, about 6 atm to about 10 atm, about 6 atm to about 12 atm, about 6 atm to about 15 atm, about 6 atm to about 20 atm, about 10 atm to about 12 atm, about 10 atm to about 15 atm, about 10 atm to about 20 atm, about 12 atm to about 15 atm, about 12 atm to about 20 atm, or about 15 atm to about 20 atm. In some cases, the method further comprises heating the saccharide solution at about 2 atm, about 6 atm, about 10 atm, about 12 atm, about 15 atm, or about 20 atm. In some cases, the method further comprises heating the saccharide solution at more than 2 atm. In some cases, the method further comprises heating the saccharide solution at 12-20 atm.

In some cases, the method further comprises separating a solid including graphene oxide from the acidic composition. In some cases, the separating comprises fractionation, centrifugation, filtration, or any combination thereof. In some cases, the filtering uses a pressure filter or electrodialysis.

In some cases, the method further comprises washing the solid including graphene oxide with a second organic solvent. In some cases, the second organic solvent comprises ethanol, methanol, or any combination thereof.

In some cases, the method further comprises drying the solid including graphene oxide.

In another aspect, disclosed is a method comprising: a) contacting a graphite powder with a first oxidizing agent to generate a first composition including graphene oxide; and b) contacting the first composition including graphene oxide with a second oxidizing agent to generate a second composition including graphene oxide, wherein the graphene oxide has an average particle diameter of no more than about 1 μm and has an oxygen atomic percentage of at least about 30%. In some cases, the graphene oxide has an average particle diameter of about 0.001 μm to about 2 μm. In some cases, the graphene oxide has an average particle diameter of at least about 0.001 μm. In some cases, the graphene oxide has an average particle diameter of at most about 2 μm. In some cases, the graphene oxide has an average particle diameter of at most about 1.5 μm. In some cases, the graphene oxide has an average particle diameter of at most about 1 μm. In some cases, the graphene oxide has an average particle diameter of at most about 0.5 μm. In some cases, the graphene oxide has an average particle diameter of at most about 0.2 μm. In some cases, the graphene oxide has an average particle diameter of at most about 0.1 μm. In some cases, the graphene oxide has an average particle diameter of at most about 0.05 μm. In some cases, the graphene oxide has an average particle diameter of at most about 0.01 μm. In some cases, the graphene oxide has an average particle diameter of about 2 μm to about 1.5 μm, about 2 μm to about 1 μm, about 2 μm to about 0.5 μm, about 2 μm to about 0.2 μm, about 2 μm to about 0.1 μm, about 2 μm to about 0.05 μm, about 2 μm to about 0.01 μm, about 2 μm to about 0.005 μm, about 2 μm to about 0.001 μm, about 1.5 μm to about 1 μm, about 1.5 μm to about 0.5 μm, about 1.5 μm to about 0.2 μm, about 1.5 μm to about 0.1 μm, about 1.5 μm to about 0.05 μm, about 1.5 μm to about 0.01 μm, about 1.5 μm to about 0.005 μm, about 1.5 μm to about 0.001 μm, about 1 μm to about 0.5 μm, about 1 μm to about 0.2 μm, about 1 μm to about 0.1 μm, about 1 μm to about 0.05 μm, about 1 μm to about 0.01 μm, about 1 μm to about 0.005 μm, about 1 μm to about 0.001 μm, about 0.5 μm to about 0.2 μm, about 0.5 μm to about 0.1 μm, about 0.5 μm to about 0.05 μm, about 0.5 μm to about 0.01 μm, about 0.5 μm to about 0.005 μm, about 0.5 μm to about 0.001 μm, about 0.2 μm to about 0.1 μm, about 0.2 μm to about 0.05 μm, about 0.2 μm to about 0.01 μm, about 0.2 μm to about 0.005 μm, about 0.2 μm to about 0.001 μm, about 0.1 μm to about 0.05 μm, about 0.1 μm to about 0.01 μm, about 0.1 μm to about 0.005 μm, about 0.1 μm to about 0.001 μm, about 0.05 μm to about 0.01 μm, about 0.05 μm to about 0.005 μm, about 0.05 μm to about 0.001 μm, about 0.01 μm to about 0.005 μm, about 0.01 μm to about 0.001 μm, or about 0.005 μm to about 0.001 μm. In some cases, the graphene oxide has an average particle diameter of about 2 μm, about 1.5 μm, about 1 μm, about 0.5 μm, about 0.2 μm, about 0.1 μm, about 0.05 μm, about 0.01 μm, about 0.005 μm, or about 0.001 μm. In some cases, the composition including graphene oxide is any composition disclosed in this document.

In some cases, the first oxidizing agent comprises oxygen oxygen ($O_2$), ozone ($O_3$), hydrogen peroxide ($H_2O_2$), Fenton's reagent, fluorine ($F_2$), chlorine ($Cl_2$), bromine ($Br_2$), iodine ($I_2$), nitric acid ($HNO_3$), sulfuric acid ($H_2SO_4$), peroxydisulfuric acid ($H_2S_2O_8$), peroxymonosulfuric acid ($H_2SO_5$), chlorite, chlorate, perchlorate, hypochlorite, bleach (NaClO), chromic acid, dichromic acid, chromium trioxide, pyridinium chlorochromate (PCC), potassium permanganate, sodium perborate, nitrous oxide ($N_2O$), nitrogen dioxide ($NO_2$), dinitrogen tetroxide ($N_2O_4$), potassium nitrate ($KNO_3$), sodium bismuthate, or any combination thereof. In some cases, the first oxidizing agent comprises sulfuric acid, potassium permanganate, hydrogen peroxide, or any combination thereof.

In some cases, the method further comprises separating the first composition including graphene oxide from the first oxidizing agent. In some cases, the separating comprises fractionation, centrifugation, filtration, or any combination thereof. In some cases, the filtering uses a pressure filter or electrodialysis. In some cases, the second oxidizing agent comprises sulfuric acid, potassium permanganate, hydrogen peroxide, or any combination thereof.

In some cases, the method further comprises separating the second composition including graphene oxide from the second oxidizing agent.

In some cases, the method further comprises washing the second composition including graphene oxide with a second organic solvent. In some cases, the second organic solvent comprises ethanol, methanol, or any combination thereof.

In some cases, the method further comprises drying the second composition including graphene oxide.

In another aspect, disclosed is a method of making a membrane comprising: contacting the composition in any one of the previous embodiments with an organic solvent. In some cases, the organic solvent comprises N,N-dimethylacetamide (DMAC), N-methyl-2-pyrrolidone (NMP), dimethyl formamide (DMF), or any combination thereof. In some cases, the organic solvent comprises an alkane, a cycloalkanone, or both. In some cases, the cycloalkanone comprises hexane, isoparaffin, light alkylate naphtha, cyclohexanone, or any combination thereof.

In some cases, the method further comprises contacting the composition with an inorganic solvent. In some cases, the method further comprises dispersing the composition in the organic solvent using a high pressure homogenizer to generate an organic solution including graphene oxide.

In some cases, the method further comprises dispersing the composition in the inorganic solvent using a high pressure homogenizer to generate an inorganic solution including graphene oxide. In some cases, the dispersing is performed at about 5,000 psi to about 30,000 psi. In some cases, the dispersing is performed at a pressure of at least about 5,000 psi. In some cases, the dispersing is performed at a pressure of at most about 30,000 psi. In some cases, the dispersing is performed at about 5,000 psi to about 10,000 psi, about 5,000 psi to about 15,000 psi, about 5,000 psi to about 20,000 psi, about 5,000 psi to about 25,000 psi, about 5,000 psi to about 30,000 psi, about 10,000 psi to about 15,000 psi, about 10,000 psi to about 20,000 psi, about 10,000 psi to about 25,000 psi, about 10,000 psi to about 30,000 psi, about 15,000 psi to about 20,000 psi, about 15,000 psi to about 25,000 psi, about 15,000 psi to about 30,000 psi, about 20,000 psi to about 25,000 psi, about 20,000 psi to about 30,000 psi, or about 25,000 psi to about 30,000 psi. In some cases, the dispersing is performed at about 5,000 psi, about 10,000 psi, about 15,000 psi, about 20,000 psi, about 25,000 psi, or about 30,000 psi. In some cases, the dispersing is performed at a pressure of more than 10,000 psi. In some cases, the dispersing is performed at 15,000-20,000 psi.

In some cases, the dispersing is performed about 2 times to about 5 times. In some cases, the dispersing is performed at least about 2 times. In some cases, the dispersing is performed at most about 5 times. In some cases, the dispersing is performed about 2 times to about 3 times, about 2 times to about 4 times, about 2 times to about 5 times, about 3 times to about 4 times, about 3 times to about 5 times, or about 4 times to about 5 times. In some cases, the dispersing is performed about 2 times, about 3 times, about 4 times, or about 5 times.

In some cases, the method further comprises contacting the organic solution including graphene oxide with a polymer to form a polymer solution. In some cases, the polymer comprises polyvinylidene fluoride (PVDF). In some cases, the PVDF has an average molecular weight of about 50,000 to about 1,000,000. In some cases, the PVDF has an average molecular weight of at least about 50,000. In some cases, the PVDF has an average molecular weight of at most about 1,000,000. In some cases, the PVDF has an average molecular weight of about 50,000 to about 100,000, about 50,000 to about 300,000, about 50,000 to about 500,000, about 50,000 to about 700,000, about 50,000 to about 800,000, about 50,000 to about 1,000,000, about 100,000 to about 300,000, about 100,000 to about 500,000, about 100,000 to about 700,000, about 100,000 to about 800,000, about 100,000 to about 1,000,000, about 300,000 to about 500,000, about 300,000 to about 700,000, about 300,000 to about 800,000, about 300,000 to about 1,000,000, about 500,000 to about 700,000, about 500,000 to about 800,000, about 500,000 to about 1,000,000, about 700,000 to about 800,000, about 700,000 to about 1,000,000, or about 800,000 to about 1,000,000. In some cases, the PVDF has an average molecular weight of about 50,000, about 100,000, about 300,000, about 500,000, about 700,000, about 800,000, or about 1,000,000. In some cases, the polyvinylidene fluoride (PVDF) has an average molecular weight of at least about 100,000. In some cases, the average molecular weight is from about 300,000 to about 700,000.

In some cases, the polyvinylidene fluoride (PVDF) is about 5% (w/w) of the composition to about 40% (w/w) of the composition. In some cases, the polyvinylidene fluoride (PVDF) is at least about 5% (w/w) of the composition. In some cases, the polyvinylidene fluoride (PVDF) is at most about 40% (w/w) of the composition. In some cases, the polyvinylidene fluoride (PVDF) is about 5% (w/w) of the composition to about 10% (w/w) of the composition, about 5% (w/w) of the composition to about 20% (w/w) of the composition, about 5% (w/w) of the composition to about 30% (w/w) of the composition, about 5% (w/w) of the composition to about 40% (w/w) of the composition, about 10% (w/w) of the composition to about 20% (w/w) of the composition, about 10% (w/w) of the composition to about 30% (w/w) of the composition, about 10% (w/w) of the composition to about 40% (w/w) of the composition, about 20% (w/w) of the composition to about 30% (w/w) of the composition, about 20% (w/w) of the composition to about 40% (w/w) of the composition, or about 30% (w/w) of the composition to about 40% (w/w) of the composition. In some cases, the polyvinylidene fluoride (PVDF) is about 5% (w/w) of the composition, about 10% (w/w) of the composition, about 20% (w/w) of the composition, about 30% (w/w) of the composition, or about 40% (w/w) of the composition. In some cases, the polyvinylidene fluoride (PVDF) is from about 10% to about 30% (w/w) of the composition.

In some cases, the polymer comprises polyethersulfone (PES). In some cases, the PES has an average molecular weight of about 10,000 to about 80,000. In some cases, the PES has an average molecular weight of at least about 10,000. In some cases, the PES has an average molecular weight of at most about 80,000. In some cases, the PES has an average molecular weight of about 10,000 to about 20,000, about 10,000 to about 30,000, about 10,000 to about 45,000, about 10,000 to about 55,000, about 10,000 to about 68,000, about 10,000 to about 80,000, about 20,000 to about 30,000, about 20,000 to about 45,000, about 20,000 to about 55,000, about 20,000 to about 68,000, about 20,000 to about 80,000, about 30,000 to about 45,000, about 30,000 to about 55,000, about 30,000 to about 68,000, about 30,000 to about 80,000, about 45,000 to about 55,000, about 45,000 to about 68,000, about 45,000 to about 80,000, about 55,000 to about 68,000, about 55,000 to about 80,000, or about 68,000 to about 80,000. In some cases, the PES has an average molecular weight of about 10,000, about 20,000, about 30,000, about 45,000, about 55,000, about 68,000, or about 80,000.

In some cases, the PES is about 10% (w/w) of the composition to about 40% (w/w) of the composition. In some cases, the PES is at least about 10% (w/w) of the composition. In some cases, the PES is at most about 40% (w/w) of the composition. In some cases, the PES is about 10% (w/w) of the composition to about 15% (w/w) of the composition, about 10% (w/w) of the composition to about 20% (w/w) of the composition, about 10% (w/w) of the composition to about 25% (w/w) of the composition, about 10% (w/w) of the composition to about 30% (w/w) of the composition, about 10% (w/w) of the composition to about 35% (w/w) of the composition, about 10% (w/w) of the composition to about 40% (w/w) of the composition, about 15% (w/w) of the composition to about 20% (w/w) of the composition, about 15% (w/w) of the composition to about 25% (w/w) of the composition, about 15% (w/w) of the composition to about 30% (w/w) of the composition, about 15% (w/w) of the composition to about 35% (w/w) of the composition, about 15% (w/w) of the composition to about 40% (w/w) of the composition, about 20% (w/w) of the composition to about 25% (w/w) of the composition, about 20% (w/w) of the composition to about 30% (w/w) of the composition, about 20% (w/w) of the composition to about 35% (w/w) of the composition, about 20% (w/w) of the composition to about 40% (w/w) of the composition, about 25% (w/w) of the composition to about 30% (w/w) of the composition, about 25% (w/w) of the composition to about 35% (w/w) of the composition, about 25% (w/w) of the composition to about 40% (w/w) of the composition, about 30% (w/w) of the composition to about 35% (w/w) of the composition, about 30% (w/w) of the composition to about 40% (w/w) of the composition, or about 35% (w/w) of the composition to about 40% (w/w) of the composition. In some cases, the PES is about 10% (w/w) of the composition, about 15% (w/w) of the composition, about 20% (w/w) of the composition, about 25% (w/w) of the composition, about 30% (w/w) of the composition, about 35% (w/w) of the composition, or about 40% (w/w) of the composition.

In some cases, the polymer comprises poly(vinyl pyrrolidone) (PVP Mw=8-2,000 kDa), triethyl phosphate (TEP), ethylene glycol (EG), perfluorosulfonic acid, or any combination thereof. In some cases, the polymer is about 1% (w/w) of the composition to about 10% (w/w) of the composition. In some cases, the polymer is at least about 1% (w/w) of the composition. In some cases, the polymer is at most about 10% (w/w) of the composition. In some cases, the polymer is about 1% (w/w) of the composition to about 3% (w/w) of the composition, about 1% (w/w) of the composition to about 5% (w/w) of the composition, about 1% (w/w) of the composition to about 8% (w/w) of the composition, about 1% (w/w) of the composition to about 10% (w/w) of the composition, about 3% (w/w) of the composition to about 5% (w/w) of the composition, about 3% (w/w) of the composition to about 8% (w/w) of the composition, about 3% (w/w) of the composition to about 10% (w/w) of the composition, about 5% (w/w) of the composition to about 8% (w/w) of the composition, about 5% (w/w) of the composition to about 10% (w/w) of the composition, or about 8% (w/w) of the composition to about 10% (w/w) of the composition. In some cases, the polymer is about 1% (w/w) of the composition, about 3% (w/w) of the composition, about 5% (w/w) of the composition, about 8% (w/w) of the composition, or about 10% (w/w) of the composition. In some cases, the polymer is from about 1% to about 8% (w/w) of the composition.

In some cases, the method further comprises heating the polymer solution to 60-70° C. In some cases, the method further comprises contacting the polymer solution with water using a spinning device. In some cases, the method further comprises contacting the polymer solution with a solution comprising polyvinyl alcohol (PVA), glutaraldehyde, dichloromethane, octadecyltrichlorosilane (ODS), hydrochloric acid (HCl), or any combination thereof. In some cases, the method further comprises contacting the polymer solution with a glycerol solution to form a hollow fiber membrane.

In some cases, the polymer comprises polyfulfone. In some cases, the polyfulfone has an average molecular weight of about 40,000 to about 100,000. In some cases, the polyfulfone has an average molecular weight of at least about 40,000. In some cases, the polyfulfone has an average molecular weight of at most about 100,000. In some cases, the polyfulfone has an average molecular weight of about 40,000 to about 50,000, about 40,000 to about 60,000, about 40,000 to about 67,000, about 40,000 to about 75,000, about 40,000 to about 81,000, about 40,000 to about 90,000, about 40,000 to about 100,000, about 50,000 to about 60,000, about 50,000 to about 67,000, about 50,000 to about 75,000, about 50,000 to about 81,000, about 50,000 to about 90,000, about 50,000 to about 100,000, about 60,000 to about 67,000, about 60,000 to about 75,000, about 60,000 to about 81,000, about 60,000 to about 90,000, about 60,000 to about 100,000, about 67,000 to about 75,000, about 67,000 to about 81,000, about 67,000 to about 90,000, about 67,000 to about 100,000, about 75,000 to about 81,000, about 75,000 to about 90,000, about 75,000 to about 100,000, about 81,000 to about 90,000, about 81,000 to about 100,000, or about 90,000 to about 100,000. In some cases, the polyfulfone has an average molecular weight of about 40,000, about 50,000, about 60,000, about 67,000, about 75,000, about 81,000, about 90,000, or about 100,000.

In some cases, the polyfulfone is about 10% (w/w) of the composition to about 40% (w/w) of the composition. In some cases, the polyfulfone is at least about 10% (w/w) of the composition. In some cases, the polyfulfone is at most about 40% (w/w) of the composition. In some cases, the polyfulfone is about 10% (w/w) of the composition to about 20% (w/w) of the composition, about 10% (w/w) of the composition to about 30% (w/w) of the composition, about 10% (w/w) of the composition to about 40% (w/w) of the composition, about 20% (w/w) of the composition to about 30% (w/w) of the composition, about 20% (w/w) of the composition to about 40% (w/w) of the composition, or about 30% (w/w) of the composition to about 40% (w/w) of the composition. In some cases, the polyfulfone is about 10% (w/w) of the composition, about 20% (w/w) of the composition, about 30% (w/w) of the composition, or about 40% (w/w) of the composition.

In some cases, the polymer comprises polysulfone (PSU), polyetherimide (PEI), polyethersulfone (PES), or any combination thereof.

In some cases, the method further comprises coating a support layer with the polymer solution. In some cases, the method further comprises contacting the inorganic solution including graphene oxide with triethylamine (TEA), camphor sulfonic acid (CSA), dimethyl sulfoxide (DMSO), m-phenylene diamine (MPD), 2-ethyl-1,3-hexane diol (EHD), sodium lauryl sulfate (SLES), or any combination thereof.

In some cases, the triethylamine (TEA) comprises from about 1% to about 4% (w/w) of the composition. In some cases, the camphor sulfonic acid (CSA) comprises from about 1% to about 5% (w/w) of the composition. In some cases, the dimethyl sulfoxide (DMSO) comprises from about 1% to about 2% (w/w) of the composition. In some cases, the m-phenylene diamine (MPD) comprises from about 0.2% to about 3% (w/w) of the composition. In some cases, the 2-ethyl-1,3-hexane diol (EHD) comprises from about 0.1% to about 0.4% (w/w) of the composition. In some cases, the sodium lauryl sulfate (SLES) comprises from about 0.1% to about 0.4% (w/w) of the composition.

In some cases, the method further comprises contacting the organic solution comprising graphene oxide with 1,3,5-benzenetricarbonyl trichloride (TMC), tributyl phosphate (TBP), or any combination thereof. In some cases, the 1,3,5-benzenetricarbonyl trichloride (TMC) comprises from about 0.01% to about 0.1% (w/w) of the composition. In some cases, the tributyl phosphate (TBP) comprises from about 0.1% to about 0.5% (w/w) of the composition.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2A shows preliminary graphene oxide particles using electron microscopy;

FIG. 2B shows graphene oxide particles using electron microscopy, when the particles were obtained after about 180 liters of an oxidation solution was applied;

FIG. 3 shows the composition of the graphene oxide characterized using ultraviolet-visible spectroscopy;

DETAILED DESCRIPTION OF THE DISCLOSURE

Figure 1A:
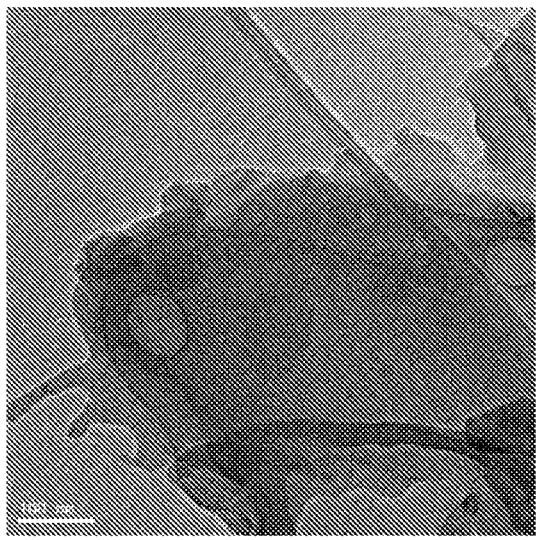
FIG. 1A is a transmission electron microscopy image of the graphene oxide synthesized using saccharide and acid compounds in accordance with Example 3.

Disclosed are compositions, membranes, devices, and methods of making graphene oxide-containing water-filtration systems.

The term "about" and its grammatical equivalents in relation to a reference numerical value as used in this document can include a range of values plus or minus 10% from that value, such as a range of values plus or minus 10%, 9%, 8%, 7%, 6%, 5%, 4%, 3%, 2%, or 1% from that value. For example, the amount "about 10" includes amounts from 9 to 11.

The singular forms "a," "an," and "the" are used in this document to include plural references unless the context dearly dictates otherwise. Accordingly, unless the contrary is indicated, the numerical parameters set forth in this document are approximations that may vary depending upon the desired properties sought to be obtained by the embodiment.

Unless otherwise indicated, open terms for example "contain," "containing," "include," "including," "have," "having," and the like mean comprising.

The term "atomic percent" as used in this document can mean the percentage of one kind of atom relative to the total number of atoms. The atomic percent can be calculated as: atomic percent=$N_i/N_{tot} \times 100\%$.

EXAMPLES

The following examples are included to more dearly demonstrate the overall nature of the disclosure. These examples are exemplary, not restrictive, of the disclosure.

Example 1—Synthesis of Graphene Oxide Using Graphite Powder

In this example, graphite powder was subjected to mechanical pulverization and/or grinding processes to obtain ultrafine graphite powder having an average particle size no more than 2 µm. 1 kilogram of the ultrafine graphite powder and 5-10 kilograms of potassium permanganate powder were added into a reactor having a liner coated with a Teflon or glass coating and stirred uniformly with a stirrer continuously, cooled and kept at a constant temperature lower than 10° C. A total volume of 40-100 liters of concentrated sulfuric acid (e.g., with a concentration greater than 94%) was added slowly, and the mixture was stirred thoroughly for 15 minutes to 1 hour.

The reactor was heated to 40-50° C. and kept at this temperature for 2-24 hours, then the reactor was cooled and kept at a constant temperature lower than 10° C., and 40-200 kilograms of ice cubes made of deionized water were added into the reactor, and the stirring was continued until all ice melted and there was no more fluctuation of the temperature of the solution. The volume ratio of deionized water to sulfuric acid can be from 1:1 to 1:2.

The reaction was stirred continually, and 2-50 liters of hydrogen peroxide were slowly added until the solution turned yellow and no more gas was generated. The amount of hydrogen peroxide added can be proportional to the amount of potassium permanganate added.

The reactor was charged with 80-300 liters of an organic solution, which can be a mixture of acetone, dichloromethane, hexane, carboxylic acid esters (such as ethyl acetate), and straight-chain primary alcohols (such as butanol). The solution was continuously stirred, heated, and kept at a constant temperature of 40-60° C., and stirred for 0.5-4 hours, and finally the device was cooled to room temperature and the stirring was stopped.

The solution in the reactor layered. The upper layer was a brown organic solution containing the graphene oxide generated by reactions. The bottom layer was a clear and colorless liquid containing sulfuric acid and a small amount of hydrogen peroxide, within which there was a partially crystallized solid.

The clear liquid and the solid in the lower layers were drained. The brown organic solution was separated and subjected to a filter pressing process via a pressure filter or electrodialysis (ED) process to obtain a final solid. The solid was added into an ethanol, methanol, isopropanol, or ethyl acetate solution to be rinsed and filtered repeatedly to eliminate the impurities like sulfuric acid and then subjected to a drying process to finally obtain the graphene oxide powder having a diameter of tens to hundreds of nanometers and being rich in hydrophilic functional groups (e.g., having an oxygen atomic percentage of 35%-50%).

Example 2—Synthesis of Graphene Oxide Using Saccharide 1-5 kilograms solid powder of monosaccharide, disaccharide and/or polysaccharide such as glucose, fructose or sucrose was added into 1 liter of deionized (DI) water, heated (at 50-80° C.), and dissolved with stirring. The obtained warm solution was placed into a steel container. The steel container was sealed, and then heated in a reacting furnace. When the steel container was heated to the temperature of 160-220° C., the pressure in the steel container could reach 12-20 atm. After 2-5 hours of reaction, the steel container was cooled to room temperature and the gas in the steel container was discharged for pressure relief. The reaction product in the steel container was taken out and subjected to a drying process to obtain solid reaction product powder.

30-60 liters of concentrated sulfuric acid with a concentration greater than 94% was added into a reactor having a liner coated with a Teflon or glass coating. The reactor was cooled and kept at a constant temperature of about 0° C. and stirring was started, then 1 kilogram of the reaction product powder was added and the obtained mixture was uniformly stirred for 15 minutes to 1 hour, and then 0.5-4 kilograms of potassium permanganate powder were added slowly into the solution with controlled temperature under 50° C. and the obtained mixture was thoroughly stirred for 15 minutes to 1 hour.

The reactor was heated to and kept at a constant temperature of 40-50° C. and stirring continued for 0.5-3 hours, then the reactor was cooled to and kept at a constant temperature lower than 10° C., and 30-60 kilograms of ice cubes made of deionized water were added and stirring continued until there was no more fluctuation of the temperature of the solution.

The reaction was stirred continually, and 6-30 liters of hydrogen peroxide were slowly added until the solution turned yellow and no more gas was generated.

The solution was then subjected to a filter pressing process via a pressure filter, or a centrifugal separation process under 2,000-4,000 rpm speed, or an electrodialysis (ED) process to obtain a final solid. The solid was added into an ethanol or methanol solution to be rinsed and filtered repeatedly to eliminate the impurities like sulfuric acid and then subjected to a drying process to finally obtain the graphene oxide powder having a diameter of tens to hundreds of nanometers and being rich in hydrophilic functional groups (having an oxygen atomic percentage of 35%-50%).

Example 3—Synthesis of Graphene Oxide Using Saccharide and Acid Compounds

Figure 1B:
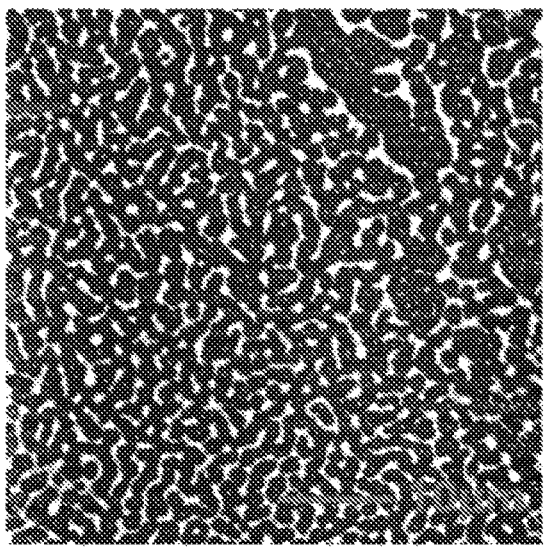
FIG. 1B is an atomic force microscopy image of the graphene oxide synthesized using saccharide and acid compounds in accordance with Example 3 at a first magnification.
Figure 1C:
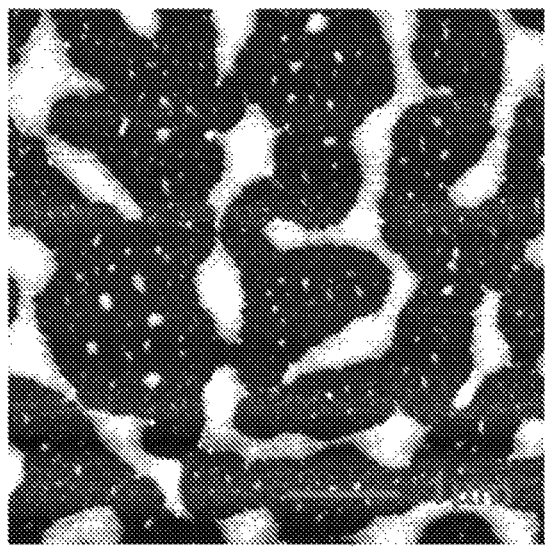
FIG. 1C is an atomic force microscopy image of the graphene oxide synthesized using saccharide and acid compounds in accordance with Example 3 at a second magnification.

Carboxyl acid, oxalic acid, citric acid, phosphoric acid, benzoic acid, dihydroxy benzene, and dopamine were added into deionized water together with a certain amount of solid powder of monosaccharide, disaccharide or polysaccharide such as glucose, fructose or sucrose, heated (at 50-80° C.), and dissolved with stirring. The obtained warm solution was placed into a steel container, and the steel container was sealed, and then heated in a reacting furnace. When the steel container was heated to 160-220° C., the pressure in the steel container could reach 12-20 atm. After 2-5 hours of reaction, the steel container was cooled to room temperature and the gas in the steel container was discharged for pressure relief. The reaction product in the steel container was taken out and added into an ethanol or methanol solution to be rinsed and filtered repeatedly to eliminate the impurities and then subjected to a drying process to finally obtain the graphene oxide powder having a diameter of tens of nanometers to a few micrometers and being rich in hydrophilic functional groups (having an oxygen atomic percentage of 30%-40%). FIG. 1A is a transmission electron microscopy (TEM) image of the graphene oxide synthesized using saccharide and acid compounds in accordance with Example 3. FIGS. 1B and 1C are atomic force microscopy (AFM) images of the graphene oxide synthesized using saccharide and acid compounds in accordance with Example 3.

Example 4—Synthesis of Graphene Oxide Using Multiple Oxidation Steps

First Oxidation: 1 kilogram of graphite powder was mixed with 30-60 liters of concentrated sulfuric acid with a concentration greater than 94%, and the mixture was stirred for 30 minutes at a constant temperature lower than 10° C. 5-10 kilograms of potassium permanganate powder were added to the mixture and subject to stirring while cooling down for 15 minutes to 1 hour, and then heated to 40-50° C. for further reaction for 2-8 hours. After the reaction, the remaining sulfuric acid and potassium permanganate solution (oxidant) was recycled via a pressure filtration or vacuum filtration process, and solid reaction product powder was obtained. The powder was then added into 60 kilograms of ice cubes, and kept being stirred until all the ice cubes were completely melted and the powder completely dissolved in the solution. 2-4 liters of hydrogen peroxide were then added into the solution and the solution was continuously stirred until no more gas was generated within the solution. The solution then settled for several hours for sedimentation to occur or subjected to a centrifugation separation process to obtain the sediment. The sediment was then subjected to a drying process under 30-40° C. to obtain a solid power product: preliminary graphene oxide (GO).

Second Oxidation: 1 kilogram of preliminary GO was added into 60 liters of oxidant solution (mixture solution of sulfuric acid and potassium permanganate in the same ratio as the previous step) and subjected to a dispersion process via a ball mill or sonic bath. The diameter of the final obtained graphene oxide could be controlled by the amount of the oxidant solution (60-300 liters).

The uniformly dispersed solution was heated to 40-50° C. for further reaction for 2-8 hours under stirring, and then mixed with 120-600 kilograms of ice cubes for dilution under stirring. 2-20 liters of hydrogen peroxide were added into the solution and the solution was continuously stirred until no more gas was generated within the solution.

The solution was then subjected to a filter pressing process via a pressure filter or an electrodialysis (ED) process to obtain solid graphene oxide. The solid graphene oxide was then added into an ethanol, methanol, isopropanol, or ethyl acetate solution to be rinsed and filtered repeatedly to eliminate the impurities like sulfuric acid and then subjected to a drying process under 30-40° C. to finally obtain the graphene oxide powder enriched with hydrophilic functional groups (having an oxygen atomic percentage of 40%-50%) with diameter ranges from tens of nanometers to hundreds of nanometers.

Example 5—Characterization of Graphene Oxide

The particle diameters were compared using electron microscopy. As shown in FIG. 2A, which illustrates preliminary graphene oxide particles using electron microscopy, the diameter of preliminary GO ranges from hundreds of nanometers to tens of micrometers. The diameter of the graphene oxide obtained after the second oxidation process ranges from 300-500 nanometers when about 180 liters of oxidation solution was applied. See FIG. 2B.

From top to bottom at 230 nm wavelength: preliminary GO, graphene oxide prepared using 120, 180, and 240 liters oxidation solution, respectively. The composition of the graphene oxide was characterized using ultraviolet-visible spectroscopy The composition of the graphene oxide was characterized using ultraviolet-visible spectroscopy, as illustrated in FIG. 3. In the UV-Vis spectrum, the peak intensity of the graphene oxide was different compared with preliminary GO. A π-π* transition peak forms at a 230 nm wavelength, which can be an indicator of preliminary GO as a result of its aromatic structure. The peak intensity of the graphene oxide sample synthesized in Example 4 at a 230 nm wavelength is lower compared with preliminary GO synthesized by the usual Hummers method, as a result of the small size in diameter and less aromatic character of the graphene oxide. From top to bottom at a 230 nm wavelength, the curves in FIG. 3 reflect preliminary GO and graphene oxide prepared using 180, 120, and 240 liters of oxidation solution, respectively. The particle size and the oxygen atomic percentage of the graphene oxide reduces as the amount of oxidation solution used in the reaction increases.

Example 6—Preparation of Graphene Oxide Composite Ultrafiltration Membrane

The graphene oxide powder was added into an organic solvent N,N-dimethylacetamide (DMAC), N-Methyl-2-pyrrolidone (NMP), or dimethyl formamide (DMF) and stirred, and then mono-layer or few-layer graphene oxide was uniformly dispersed into the organic solvent DMAC, NMP, NEP, or DMF and repeated at least three times using a high pressure homogenizer at a pressure of 15,000-20,000 psi, to make a graphene oxide-dispersed organic solution A.

The graphene oxide powder was also added into deionized water and stirred, and then mono-layer or few-layer graphene oxide was uniformly dispersed into the inorganic solvent in deionized water and repeated at least three times using a high pressure homogenizer at a pressure of 15,000-20,000 psi, to make a graphene oxide-dispersed inorganic solution B.

Figure 4:
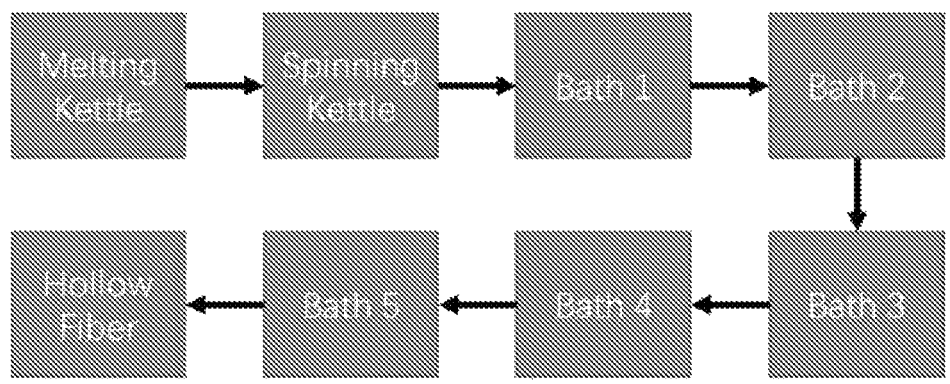
FIG. 4 is a flow chart of the process used to prepare a graphene oxide composite ultrafiltration membrane.

The process used to prepare a graphene oxide composite ultrafiltration membrane is shown in FIG. 4. Poly(vinyl pyrrolidone) (PVP Mw=8-2,000 kDa)), triethyl phosphate (TEP), ethylene Glycol (EG), polyethylene glycol (PEG), and perfluorosulfonic acid were added into a melting kettle together with polyvinylidene fluoride (PVDF) solid particles and the graphene oxide-dispersed organic solution A. The PVDF was a combination of various PVDF particles with different molecular weight ranges from 300,000-700,000. The mixture was then heated and kept at a constant temperature of 40-70° C., and continuously stirred for a few hours until all of the raw materials were completely dissolved and uniformly mixed. Thereafter, the solution entered a spinning kettle from the melting kettle, and was degassed under negative pressure to remove air bubbles at a constant temperature of 40-70° C., so as to achieve a PVDF solution.

Figure 5A:
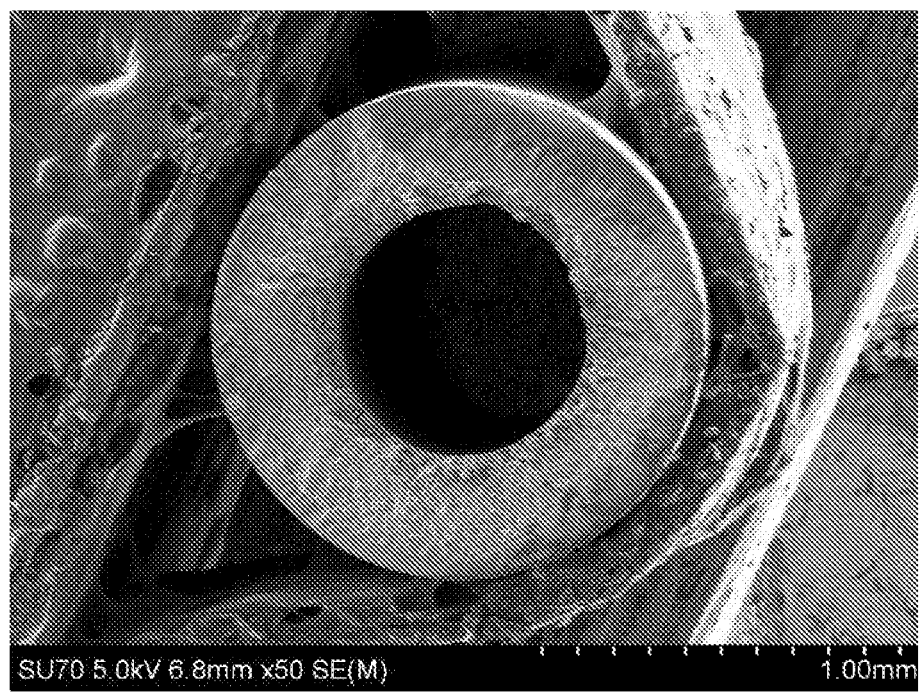
FIG. 5A is a scanning electron microscope image in cross section of the graphene oxide-PVDF composite ultrafiltration hollow fiber membrane prepared in accordance with Example 6 at a first magnification.
Figure 5B:
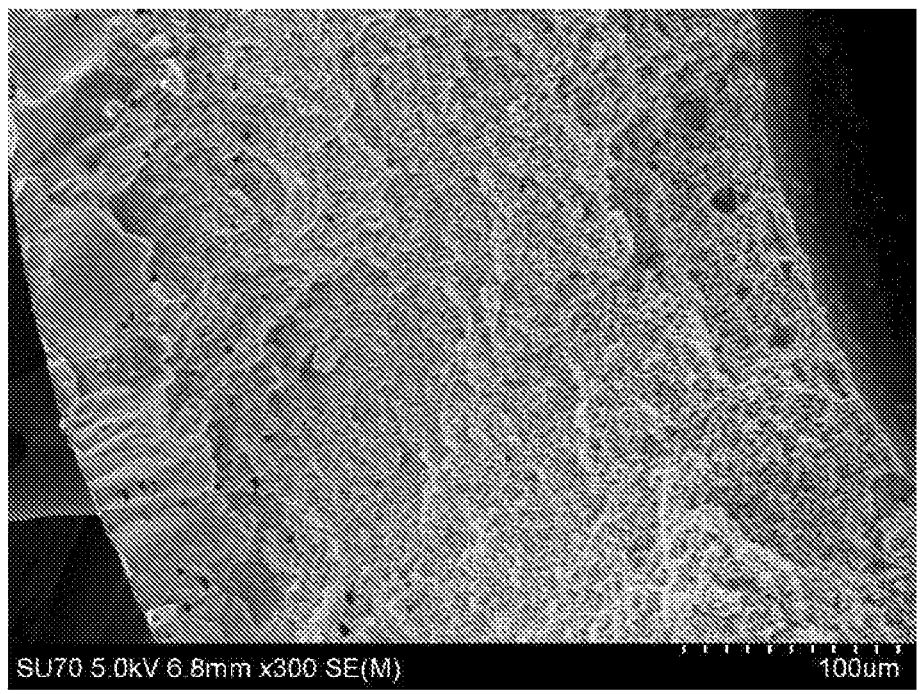
FIG. 5B is a scanning electron microscope image in cross section of the graphene oxide-PVDF composite ultrafiltration hollow fiber membrane prepared in accordance with Example 6 at a second magnification.
Figure 5C:
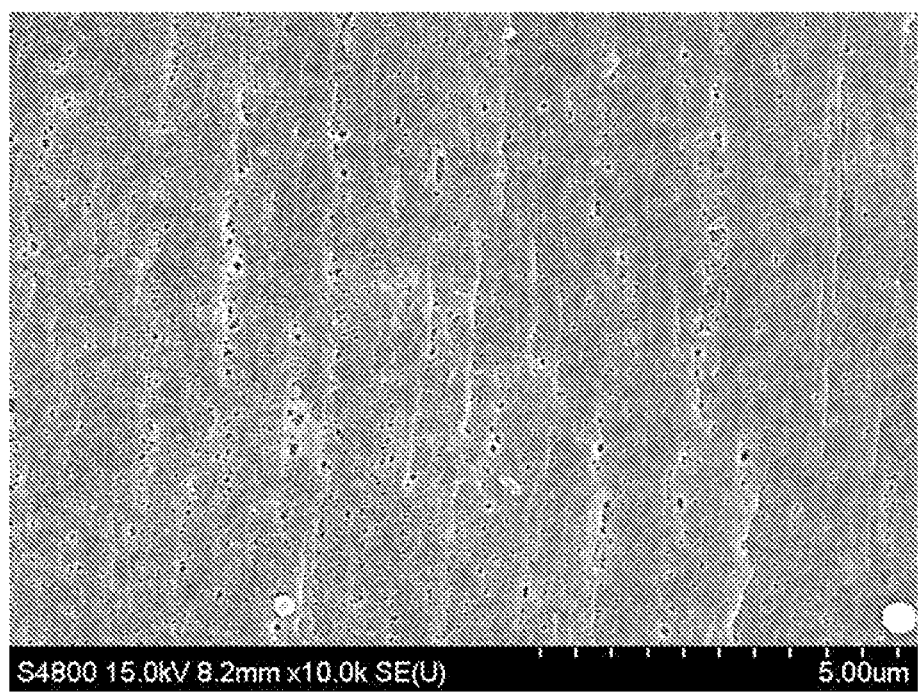
FIG. 5C is a scanning electron microscope image of the surface of the graphene oxide-PVDF composite ultrafiltration hollow fiber membrane prepared in accordance with Example 6 at a first magnification.
Figure 5D:
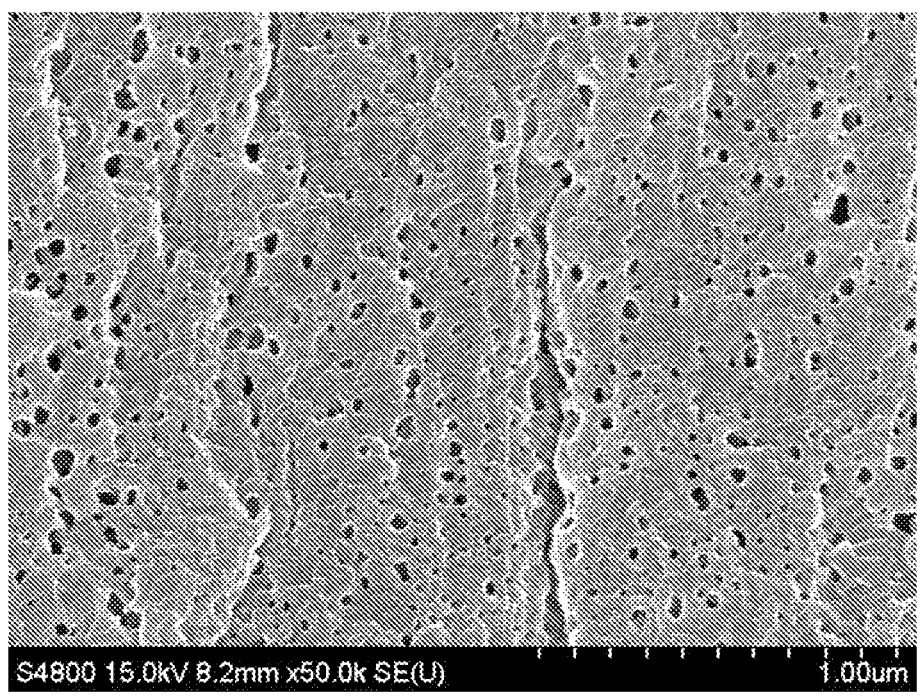
FIG. 5D is a scanning electron microscope image of the surface of the graphene oxide-PVDF composite ultrafiltration hollow fiber membrane prepared in accordance with Example 6 at a second magnification.

A dry-wet spinning process and a spinning system device were used to make a hollow fiber membrane (a dry-jet, wet-spinning process with a batch-type wet spinning machine via NIPS). The PVDF solution in the spinning kettle was extruded into a coagulation Bath No. 1 of water (pure water containing a certain amount of inorganic solution B) at 5-30° C. through a compressed gas by a spinneret plate, and the extruded solution was subjected to phase inversion to form brown linear solids when contacted with water. Using a winding system, the linear solids were connected, slowly pulled out, and guided to a coagulation Bath No. 2 of a mixed solution of methanol or ethanol and water for immersion therein for a period of time, then the immersed solids were slowly pulled out, and in the same way sequentially immersed into a reaction Bath No. 3, a reaction Bath No. 4, and a washing Bath No. 5, each for a period of time. The reaction Baths No. 3 and No. 4 were respectively an aqueous solution or an organic solution composed of polyvinyl alcohol (PVA), glutaraldehyde, the graphene oxide-dispersed inorganic solution B, dichloromethane, octadecyltrichlorosilane (ODS), and hydrochloric acid (Ha). The washing Bath No. 5 was a glycerol aqueous solution. The linear solids were pulled out of the washing Bath No. 5 to obtain a hollow fiber ultrafiltration membrane as a final product. FIGS. 5A and 5B are scanning electron microscope (SEM) images of the graphene oxide-PVDF composite ultrafiltration hollow fiber membrane in cross section; FIGS. 5C and 5D are SEM images of the graphene oxide-PVDF composite ultrafiltration hollow fiber membrane surface.

The graphene oxide composite hollow fiber ultrafiltration membrane had an inner diameter of 0.6-0.8 mm and an outer diameter of 1.2-1.4 mm; a membrane-surface water contact angle of 40°-60°; a membrane-surface pore diameter adjustable between 10-100 nanometers based on different chemical formula ratios; a porosity of 70-90%; and a water flux of 400-600 LMH/bar.

The graphene oxide had a large number of hydrophilic functional groups such as carboxyl groups, epoxy groups, and hydroxyl groups on surfaces and edges thereof, so that attachment of these groups to the surface of the polymer molecular chain can improve hydrophilicity of the surface, can improve water permeation efficiency, and can effectively prevent pollution caused by organism attachment and reproduction due to the low interface energy between the surface and water. In addition, the functional groups of graphene ensured a relatively higher negative zeta potential, which may also prevent the attachment of dirt and its accumulation on the surface of the membrane. This can extend the life or cleaning cycle of the ultrafiltration membrane by 2-5 times.

The hydrophilic functional group could capture water molecules to form a moisture layer on the surface of the membrane, so that most of the lipophilic contaminants and bacteria are unable or less likely to adhere to the surface of the membrane. Therefore, the anti-fouling of the entire film and the recovery ability after backwashing can be improved. The hydrophilicity would suppress the hydrophobic-hydrophobic interaction between bacteria and the membrane surface. A negatively charged membrane surface could generate electrostatic repulsions against negatively charged bacteria and extracellular polymeric substances (EPS).

Figure 6:
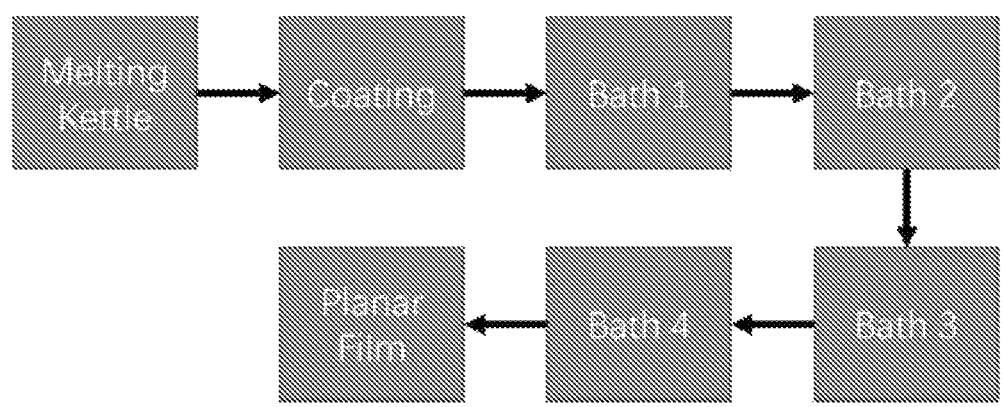
FIG. 6 is a flow chart of the process used to prepare a second graphene oxide composite ultrafiltration membrane.
Figure 7A:
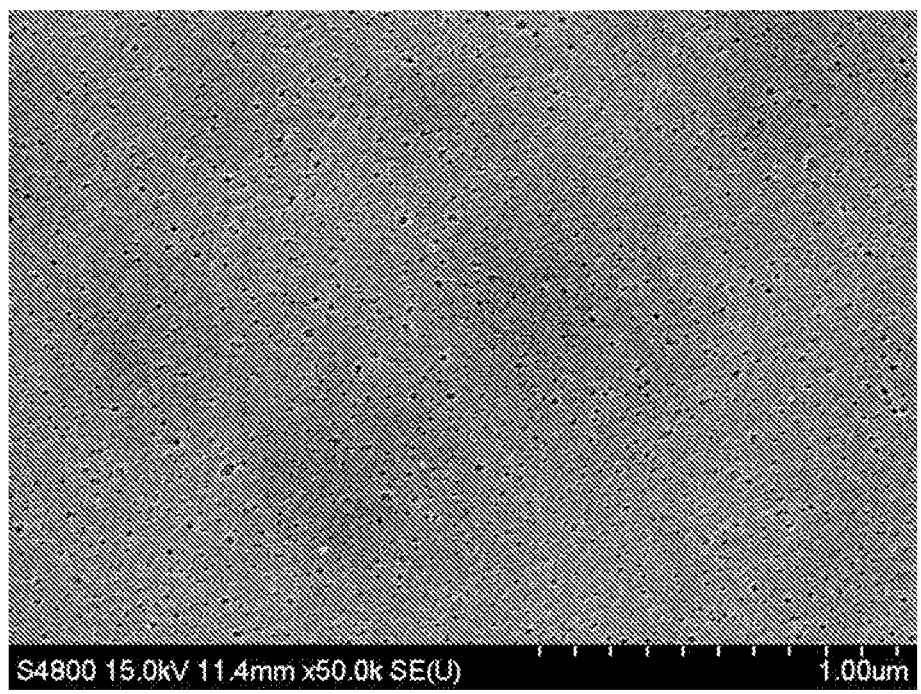
FIG. 7A is a scanning electron microscope image of the graphene oxide-PSF composite ultrafiltration membrane surface prepared in accordance with Example 7 at a first magnification.
Figure 7B:
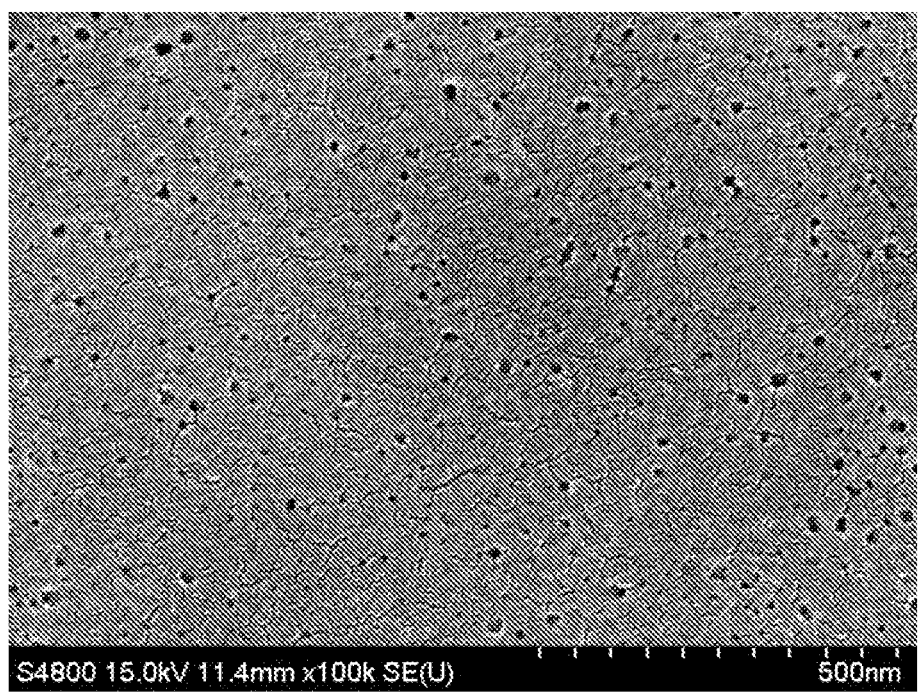
FIG. 7B is a scanning electron microscope image of the graphene oxide-PSF composite ultrafiltration membrane surface prepared in accordance with Example 7 at a second magnification.

Example 7—Preparation of Another Graphene Oxide Composite Ultrafiltration Membrane The process used to prepare a second graphene oxide composite ultrafiltration membrane is shown in FIG. 6. 10-25 wt % of polysulfone (PSU), poly(oxyphenylene sulfone), polyetherimide (PEI), and polyethersulfone (PES) and a certain amount of Polyethylene glycol (PEG) were added into a melting kettle together with the graphene oxide-dispersed organic solution A. The polysulfone was a combination of various polysulfone particles with different molecular weight ranges from 67,000-81,000. The mixture was then heated and kept at a constant temperature of 40-70° C., and continuously stirred for a few hours until all of the raw materials were completely dissolved and uniformly mixed. Thereafter, the solution was degassed under negative pressure to remove air bubbles at a constant temperature of 40-70° C., so as to achieve a PSU Solution A polypropylene nonwoven fabric support layer was pre-wet using an organic solvent N,N-dimethylacetamide (DMAC), N-Methyl-2-pyrrolidone (NMP), or dimethyl formamide (DMF), and then the surface of the nonwoven fabric was coated with the PSU solution using a micrometric film applicator or a casting knife. Then the coated nonwoven fabric was immersed into a coagulation Bath No. 1 of water (pure water containing a certain amount of inorganic solution B) at 5-30° C. for soaking, during which the PSU solution was cured through phase inversion to generate an ultrafiltration membrane layer on the surface of the nonwoven fabric. The membrane sheet was taken out, excess liquid was removed from the surface of the membrane by an air knife, and the membrane sheet was dried by baking in an oven at 40-60° C. and then again immersed into a reaction Bath No. 2 of a solution consisting of polyvinyl alcohol (PVA), glutaraldehyde, the graphene oxide-dispersed inorganic solution B, dichloromethane, octadecyltrichlorosilane (ODS) and hydrochloric acid (HCl). The immersed membrane sheet was taken out, excess liquid was removed from the surface of the membrane by the air knife, and then the membrane sheet was again immersed into a washing Bath No. 3 of a mixed solution of methanol or ethanol and water for soak cleaning. The cleaned membrane sheet was taken out, excess liquid was removed from the surface of the membrane by the air knife, and the membrane sheet was dried by baking in an oven at 40-60° C. and then again immersed into a washing Bath No. 4 of pure water for soak cleaning. Finally, the cleaned membrane sheet was taken out, excess liquid was removed from the surface of the membrane by the air knife, and the membrane sheet was dried by baking in an oven at 40-60° C., to obtain a planar ultrafiltration membrane as a final product. The graphene oxide composite planar ultrafiltration membrane had a membrane-surface water contact angle of 40°-60°; a membrane-surface pore diameter adjustable between 10-100 nanometers based on different chemical formula ratios; a porosity of 70-90%; and a water flux of 400-600 LMH/bar. FIGS. 7A and 7B are scanning electron microscope (SEM) images of the membrane surface at two different magnifications.

Example 8—Preparation of Graphene Oxide Composite Nanofiltration Membrane

Figure 8:
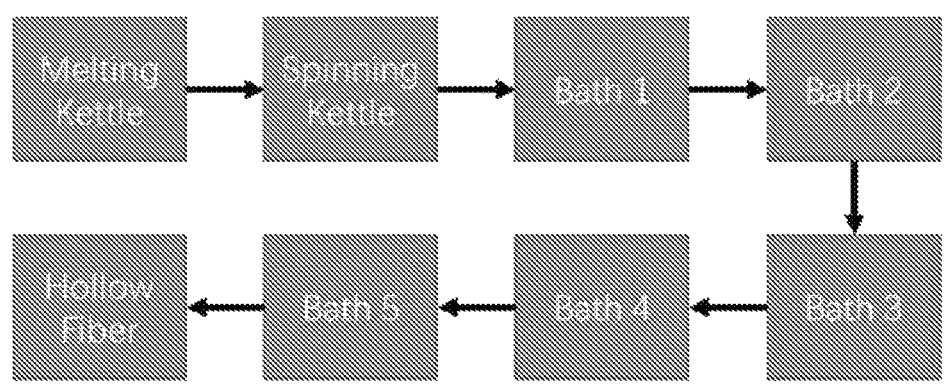
FIG. 8 is a flow chart of the process used to prepare a graphene oxide composite nanofiltration membrane.

The process used to prepare a graphene oxide composite nanofiltration membrane is shown in FIG. 8. Poly(vinyl pyrrolidone) (PVP Mw=8-2,000 kDa), triethyl phosphate (TEP), ethylene glycol (EG), polyethylene glycol (PEG), and dopamine were added into a melting kettle together with 15-30 wt % of polyethersulfone (PES) solid particles and the graphene oxide-dispersed organic solution A. The PES was a combination of various PES particles with different molecular weight ranges from 45,000-68,000. The mixture was then heated and kept at a constant temperature of 40-70° C., and continuously stirred for a few hours until all of the raw materials were completely dissolved and uniformly mixed. Thereafter, the solution entered a spinning kettle from the melting kettle, and was degassed under negative pressure to remove air bubbles at a constant temperature of 40-70° C., so as to achieve a PES solution.

A dry-wet spinning process and a spinning system device (dry-jet, wet-spinning process with the spinning system) were used to make a hollow fiber membrane. The PES solution in the spinning kettle was extruded into a coagulation Bath No. 1 of water (pure water containing a certain amount of inorganic solution B) at 5-30° C. through a compressed gas by a spinneret plate, and the extruded solution was subjected to phase inversion to form brown linear solids when contacted with water. Using a winding system, the linear solids were connected, slowly pulled out, and guided to a coagulation Bath No. 2 of a mixed solution of methanol or ethanol and water for immersion therein for a period of time, then the immersed solids were slowly pulled out, and in the same way sequentially immersed into a reaction Bath No. 3, a reaction Bath No. 4, and a washing Bath No. 5, each for a period of time. The reaction Baths No. 3 and No. 4 were respectively an aqueous solution or an organic solution composed of polyvinyl alcohol (PVA), glutaraldehyde, the graphene oxide-dispersed inorganic solution B, dichloromethane, octadecyltrichlorosilane (ODS), and hydrochloric acid (HCl). The washing Bath No. 5 was a glycerol aqueous solution. The linear solids were pulled out of the washing Bath No. 5 to obtain a hollow fiber ultrafiltration membrane as a final product.

The graphene oxide composite hollow fiber ultrafiltration membrane had an inner diameter of 0.6-0.8 mm and an outer diameter of 1.2-1.4 mm; a membrane-surface water contact angle of 40°-60°; a membrane-surface pore diameter adjustable between 1-10 nanometers based on different chemical formula ratios; and a water flux of 20-120 LMH/bar.

Figure 9:
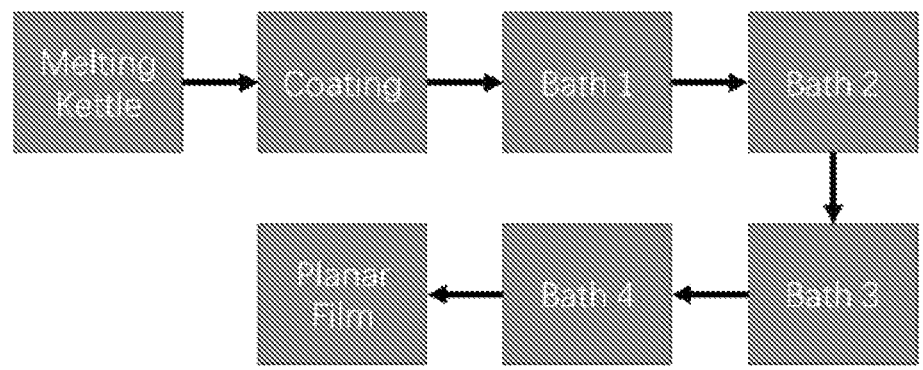
FIG. 9 is a flow chart of the process used to prepare a second graphene oxide composite nanofiltration membrane.
Figure 10:
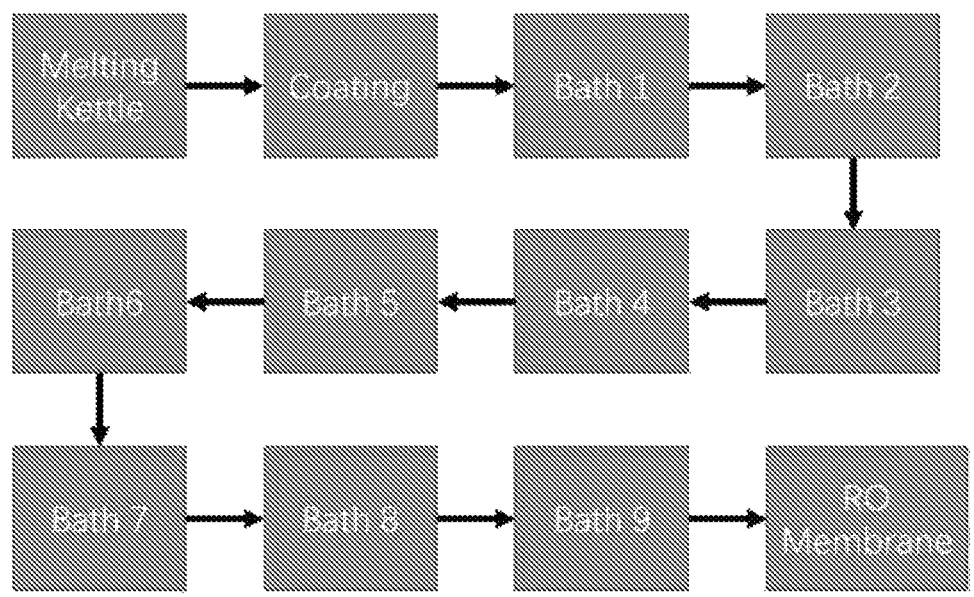
FIG. 10 is a flow chart of the process used to prepare a graphene oxide composite polyamide selection layer.

Example 9—Preparation of Another Graphene Oxide Composite Nanofiltration Membrane The process used to prepare a second graphene oxide composite nanofiltration membrane is shown in FIG. 9. Poly(vinyl pyrrolidone) (PVP Mw=8-2,000 KDa), triethyl phosphate (TEP), ethylene glycol (EG), polyethylene glycol (PEG), and dopamine were added into a melting kettle together with 15-30 wt % of polyethersulfone (PES) solid particles and the graphene oxide-dispersed organic solution A. The PES was a combination of various PES particles with different molecular weight ranges from 45,000-68,000 mixed. The mixture was then heated and kept at a constant temperature of 40-70° C., and continuously stirred for a few hours until all of the raw materials were completely dissolved and uniformly mixed. Thereafter, the solution entered a spinning kettle from the melting kettle, and was degassed under negative pressure to remove air bubbles at a constant temperature of 40-70° C., so as to achieve a PES solution.

A polypropylene nonwoven fabric support layer was pre-wet using an organic solvent N,N-dimethylacetamide (DMAC), N-Methyl-2-pyrrolidone (NMP), or dimethyl formamide (DMF), and then the surface of the nonwoven fabric was coated with the PSU solution using a micrometric film applicator or a casting knife and subsequently immersed into a coagulation Bath No. 1 of water (pure water containing a certain amount of inorganic solution B) at 5-30° C., during which the PSU solution was cured through phase inversion to generate a nanofiltration membrane layer on the surface of the nonwoven fabric. The membrane sheet was taken out, excess liquid was removed from the surface of the membrane by an air knife, and the membrane sheet was dried by baking in an oven at 40-60° C. Then the dried membrane sheet was again immersed into a reaction Bath No. 2 of a solution consisting of polyvinyl alcohol (PVA), glutaraldehyde, the graphene oxide-dispersed inorganic solution B, dichloromethane, octadecyltrichlorosilane (ODS), and hydrochloric acid (HCl). The immersed membrane sheet was taken out, excess liquid was removed from the surface of the membrane by the air knife, and then the membrane sheet was again immersed into a washing Bath No. 3 of a mixed solution of methanol or ethanol and water for soak cleaning. The cleaned membrane sheet was taken out, excess liquid was removed from the surface of the membrane by the air knife, and the membrane sheet was dried by baking in an oven at 40-60° C. and then again immersed into a washing Bath No. 4 of pure water for soak cleaning. Finally, the cleaned membrane sheet was taken out, excess liquid was removed from the surface of the membrane by the air knife, and the membrane sheet was dried by baking in an oven at 40-60° C., to obtain a planar nanofiltration membrane as a final product. The graphene oxide composite nanofiltration membrane had a membrane-surface water contact angle of 40°-60°; a membrane-surface pore diameter adjustable between 1-10 nanometers based on different chemical formula ratios; and a water flux of 20-120 LMH/bar.

Example 10—Preparation of Graphene Oxide Reverse Osmosis Membrane

The graphene oxide reverse osmosis membrane can have a graphene oxide composite ultrafiltration membrane support layer (e.g., using the same process as in Example 7) and a graphene oxide composite polyamide selection layer.

The graphene oxide powder was added into organic solvent alkanes or cycloalkanones such as hexane, isoparaffin, light alkylate naphtha, or cyclohexanone and stirred, and then mono-layer or few-layer graphene oxide was uniformly dispersed into the organic solvent alkanes or cycloalkanones such as hexane, isoparaffin, light alkylate naphtha, or cyclohexanone and repeated at least three times using a high pressure homogenizer at a pressure of 15,000-20,000 psi, to make a graphene oxide-dispersed organic solution C.

The process to prepare the graphene oxide composite polyamide selection layer is shown in FIG. 10, 1-4 wt % of triethylamine (TEA), 1-5 wt % of camphor sulfonic acid (CSA), 0.5-6 wt % of m-phenylene diamine (MPD), a certain amount of dimethyl sulfoxide (DMSO), 2-ethyl-1,3-hexane did (EHD), sodium lauryl sulfate (SLES), 2-ethylhexanol, dioctyl fumarate, bis(2-ethylhexyl) adipate, polyethylene glycol (PEG), octanoic acid, 1,2,3-propanetriyl ester, dioctyl phthalate, dimethyl silicone oil, ethanol, methanol, and isopropanol were respectively added into the graphene oxide-dispersed inorganic solution B to obtain a solution D.

0.01-0.2% of 1,3,5-benzenetricarbonyl trichloride (TMC), 0.1-0.5 wt % of tributyl phosphate (TBP), and the graphene oxide-dispersed organic solution C were added and well dissolved with stirring into an organic solution of alkanes or cycloalkanones such as hexane, isoparaffin, light alkylate naphtha, or cyclohexanone, to obtain a solution E.

The graphene oxide composite ultrafiltration membrane was immersed into a reaction Bath No. 5 of the solution D for thorough soaking, and taken out, subsequently the excess solution D on the surface of the membrane was removed using an air knife or a butadiene rubber roller, and then the ultrafiltration membrane was immersed into a reaction Bath No. 6 of the solution E, such that the solution D within gaps of the ultrafiltration membrane diffused onto the surface of the membrane to meet the solution E and underwent an interfacial polymerization reaction, so as to form a graphene oxide composite polyamide selection layer.

The membrane was taken out from the reaction Bath No. 6, and then immersed into a washing Bath No. 7 of the organic solvent alkanes or cycloalkanones such as hexane, isoparaffin, light alkylate naphtha, or cyclohexanone for soak cleaning, subsequently dried by baking in an oven at 40-60° C., then again respectively immersed in Bath No. 8 of a certain concentration of NaOCl and $Na_2CO_3$ aqueous solution and a washing Bath No. 9 of pure water for respective soak cleaning, and dried by baking in the oven at 40-60° C., to finally obtain the planar reverse osmosis membrane as a final product.

The graphene oxide composite reverse osmosis membrane had a membrane-surface water contact angle of 40°-60°; a water flux up to 3-5.4 LMH/bar at a pressure of 15.5 bar when 2,000 ppm of sodium chloride solution was used; and a desalinization ratio of 99%.

Figure 11A:
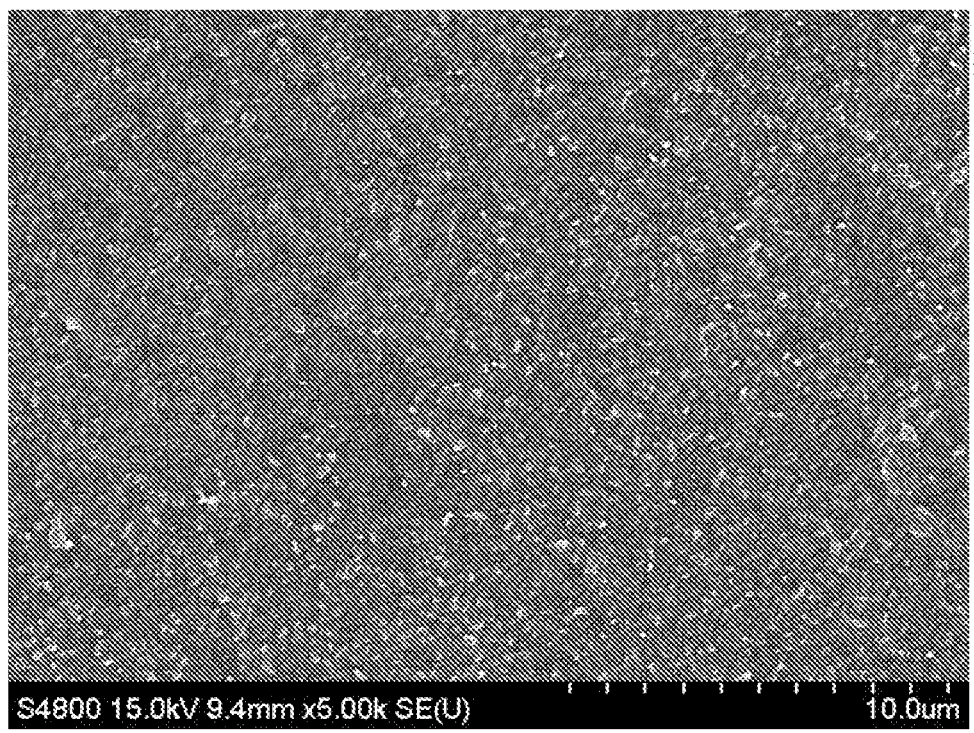
FIG. 11A is a scanning electron microscope image of the surface of the graphene oxide composite reverse osmosis membrane prepared in accordance with Example 10 at a first magnification.
Figure 11B:
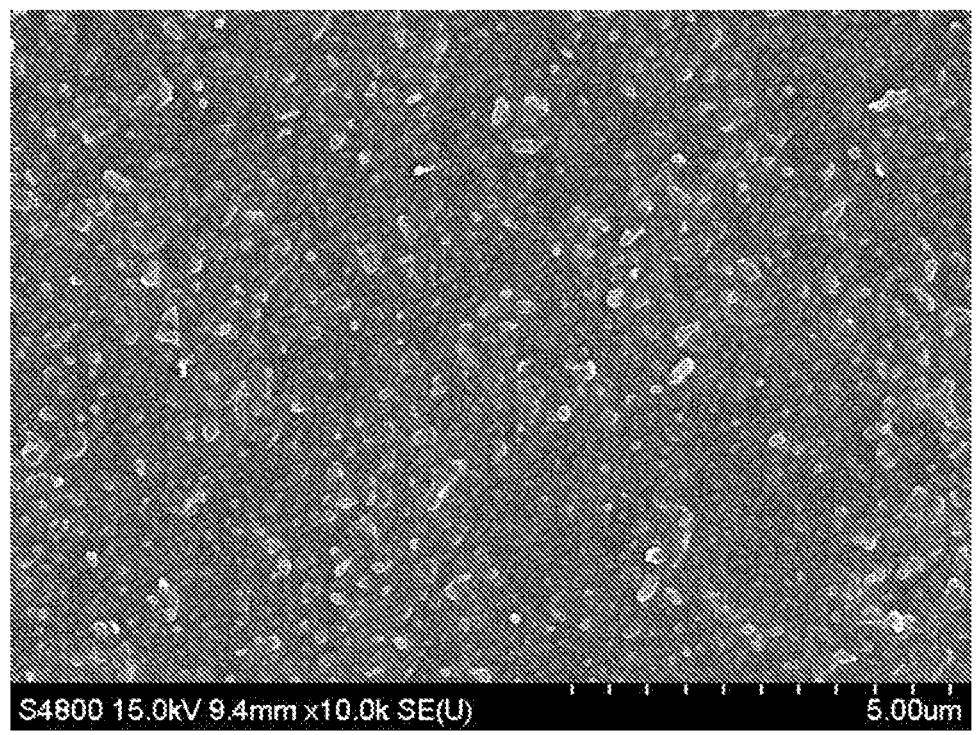
FIG. 11B is a scanning electron microscope image of the surface of the graphene oxide composite reverse osmosis membrane prepared in accordance with Example 10 at a second magnification.
Figure 11C:
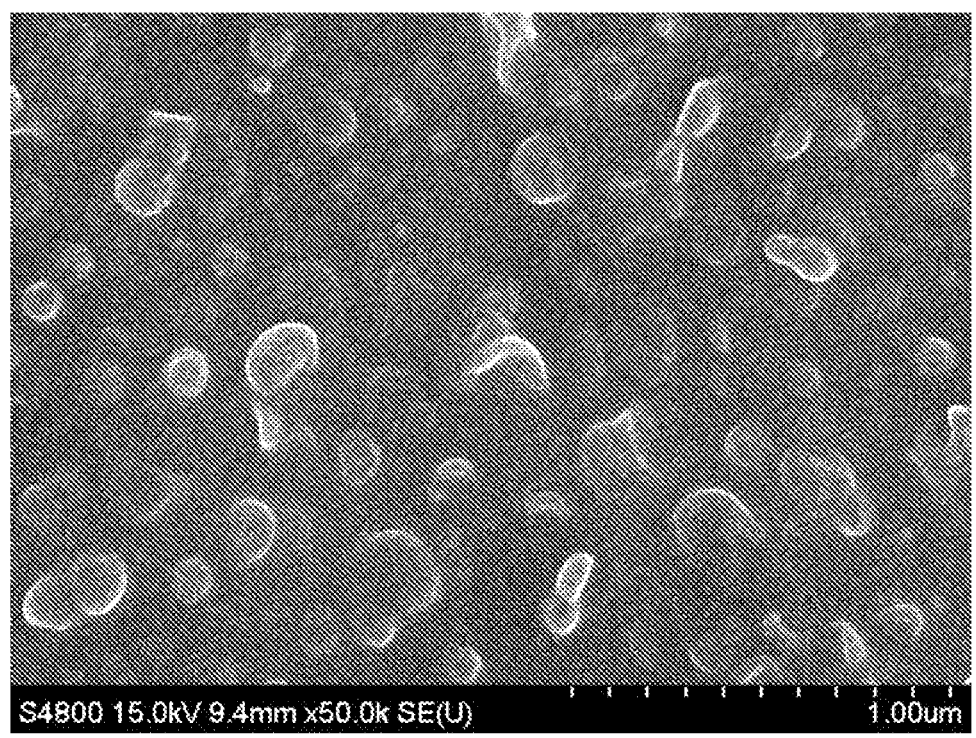
FIG. 11C is a scanning electron microscope image of the surface of the graphene oxide composite reverse osmosis membrane prepared in accordance with Example 10 at a third magnification.

The graphene oxide had a large number of hydrophilic functional groups such as carboxyl groups, epoxy groups, and hydroxyl groups on surfaces and edges thereof, which could significantly improve the surface hydrophilicity, electronegativity, and surface smoothness of the membranes, and as a result the graphene oxide enhanced membranes have higher water permeability. Moreover, the hydrophilic functional group could capture water molecules to form a moisture layer on the surface of the membrane, and by coordinating with the improved surface smoothness, make the lipophilic contaminants and bacteria unable or less likely to adhere to the surface of the membrane. Therefore, the anti-fouling of the entire film and the recovery ability after backwashing can be improved. In addition, the functional groups of graphene ensured a relatively higher negative zeta potential, which may also prevent the attachment of dirt and its accumulation on the surface of the membrane. This can extend the life or cleaning cycle of the ultrafiltration membrane by 2-3 times. FIGS. 11A, 11B, and 11C are SEM images of the surface of the graphene oxide composite reverse osmosis membrane at three different magnifications.

While preferred embodiments of the present invention have been shown and described in this document, it will be obvious to those skilled in the art that such embodiments are provided by way of example only. Numerous variations, changes, and substitutions will now occur to those skilled in the art without departing from the invention. It should be understood that various alteratives to the embodiments of the invention described in this document may be used in practicing the invention. It is intended that the following claims define the scope of the invention and that methods and structures within the scope of these claims and their equivalents be covered thereby.

What is claimed is:

1. A composition comprising target graphene oxide, wherein
   the target graphene oxide has an average particle diameter of no more than about 1 µm and has an oxygen atomic percentage of at least about 30%; and
   the target graphene oxide is prepared by:
   providing a graphite powder:
   providing a first oxidizing agent;
   contacting the graphite powder with the first oxidizing agent to generate a first composition including preliminary graphene oxide;
   separating the first composition from the first oxidizing agent; and
   contacting the first composition with a second oxidizing agent to generate a second composition including the target graphene oxide, wherein the average particle diameter of the target graphene oxide of the second composition is smaller than an average particle diameter of the preliminary graphene oxide of the first composition.

2. The composition of claim 1, wherein the target graphene oxide has a lower absorbance level at a 230 nm wavelength than a graphene oxide having an average particle diameter of more than 1 µm or a graphene oxide having an oxygen atomic percentage of less than 30%.

3. The composition of claim 1, further comprising an organic solvent, which comprises a nonpolar solvent, a polar aprotic solvent, a polar protic solvent, or any combination thereof.

4. The composition of claim 3, wherein the organic solvent comprises N,N- dimethylacetamide (DMAC), N-methyl-2-pyrrolidone (NMP), dimethyl formamide (DMF), or any combination thereof.

5. The composition of claim 1, further comprising a polymer, which comprises polyvinylidene fluoride (PVDF) having an average molecular weight from about 300,000 to about 700,000.

6. The composition of claim 5, wherein the polyvinylidene fluoride (PVDF) is from about 10% to about 30% (w/w) of the composition.

7. The composition of claim 5, wherein the polymer comprises poly(vinyl pyrrolidone) (PVP Mw=8-2,000 kDa), triethyl phosphate (TEP), ethylene glycol (EG), perfluorosulfonic acid, or any combination thereof.

8. The composition of claim 7, wherein the polymer is from about 1% to about 8% (w/w) of the composition.

9. The composition of claim 1, further comprising polyethersulfone (PES) having an average molecular weight from about 45,000 to about 68,000.

10. A membrane comprising the composition of claim 1, wherein the membrane has a water permeability of at least 200 LMH/bar.

11. The membrane of claim 10, having a water contact angle of smaller than about 80°.

12. The membrane of claim 10, wherein the average surface pore diameter is from about 10 nm to about 150 nm.

13. The membrane of claim 10, having a porosity of at least 50%.

14. A method comprising:
providing a graphite powder;
providing a first oxidizing agent; and
contacting the graphite powder with the first oxidizing agent to generate a first composition including preliminary graphene oxide;
separating the first composition from the first oxidizing agent; and
contacting the first composition with a second oxidizing agent to generate a second composition including target graphene oxide, wherein the target graphene oxide has an average particle diameter of no more than about 1 μm and an oxygen atomic percentage of at least about 30%, and the average particle diameter of the target graphene oxide of the second composition is smaller than an average particle diameter of the preliminary graphene oxide of the first composition.

15. A method comprising:
a) heating a saccharide solution to generate a solid powder; and
b) contacting the solid powder with an oxidizing agent to generate a composition including graphene oxide, wherein the graphene oxide has an average particle diameter of no more than about 1 μm and an oxygen atomic percentage of at least about 30%.

16. The method of claim 15, wherein the saccharide comprises from about 1% to about 60% (w/w) of the composition.

17. The method of claim 15, comprising heating the saccharide solution to 180-2200C.

18. The method of claim 15, comprising heating the saccharide solution at a pressure of 12-20 atm.

19. The method of claim 1, wherein the target graphene oxide has the oxygen atomic percentage of at least about 40%.

20. The method of claim 1, wherein the target graphene oxide has the oxygen atomic percentage of 40%-50%.

* * * * *